(12) United States Patent
Zhang et al.

(10) Patent No.: US 11,940,677 B1
(45) Date of Patent: Mar. 26, 2024

(54) HIGH PERFORMANCE OPTICAL MODULATOR

(71) Applicant: HyperLight Corporation, Cambridge, MA (US)

(72) Inventors: Mian Zhang, Cambridge, MA (US); Christian Reimer, Wellesley, MA (US); Prashanta Kharel, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 17/532,635

(22) Filed: Nov. 22, 2021

Related U.S. Application Data

(60) Provisional application No. 63/117,367, filed on Nov. 23, 2020.

(51) Int. Cl.
*G02F 1/01* (2006.01)

(52) U.S. Cl.
CPC .................................. *G02F 1/011* (2013.01)

(58) Field of Classification Search
CPC ........ G02F 1/011; G02F 1/0344; G02F 1/035; G02F 1/0356; G02F 1/2255; G02F 1/2257; G02F 1/3134
See application file for complete search history.

(56) References Cited

U.S. PATENT DOCUMENTS 11,562,221 B2 * 1/2023 Abel .......................... G02F 1/19

* cited by examiner

*Primary Examiner* — John Bedtelyon
(74) *Attorney, Agent, or Firm* — Van Pelt, Yi & James LLP

(57) ABSTRACT

An optical device including a waveguide, electrodes, and a connecting dielectric is described. The waveguide includes an electro-optic material having a waveguide optical refractive index and a waveguide microwave dielectric constant. The electrodes include a first electrode and a second electrode. The waveguide is between the first electrode and the second electrode. At least a portion of the connecting dielectric is between the waveguide and electrodes. The connecting dielectric has a microwave dielectric constant greater than the waveguide microwave dielectric constant.

21 Claims, 8 Drawing Sheets

HIGH PERFORMANCE OPTICAL MODULATOR

CROSS REFERENCE TO OTHER APPLICATIONS

This application claims priority to U.S. Provisional Patent Application No. 63/117,367 entitled HIGH PERFORMANCE OPTICAL MODULATOR filed Nov. 23, 2020 which is incorporated herein by reference for all purposes.

BACKGROUND OF THE INVENTION

A conventional integrated electro-optic modulator typically includes a waveguide as well as electrodes place on two sides of the waveguide. The waveguide includes an electro-optic material, such as lithium niobate or lithium tantalate. A cladding layer typically resides on the waveguide and electrodes. The waveguide is typically a ridge waveguide, including a ridge of electro-optic material that is raised up above a slab of the same electro-optic material. For example, the waveguide is typically formed by etching partially through a layer of the electro-optic material to form the sidewalls of the ridge. The optical index of refraction of the cladding is typically less than the waveguide optical index of refraction. Thus, the waveguide can confine the optical mode and the waveguide core region is separated from the electrode to reduce absorption losses. The microwave index of refraction of the cladding is also generally less than that of the electro-optic material(s) used in the waveguide.

In order to modulate the optical signal in the waveguide, a microwave signal is driven through the electrodes. The presence of the slab helps allow the electric fields generated by the microwave signal to propagate efficiently through the waveguide. The electric field changes the index of refraction of the electro-optic material, modulating the optical signal carried by the waveguide. However, the finite ridge height of the waveguide still causes decreased electric field penetration through the side walls. This may limit the optical modulation produced by a given microwave signal. Consequently, an electro-optic device having improved microwave and optical performance is still desired.

BRIEF DESCRIPTION OF THE DRAWINGS

Various embodiments of the invention are disclosed in the following detailed description and the accompanying drawings.

DETAILED DESCRIPTION

Figure 1A:
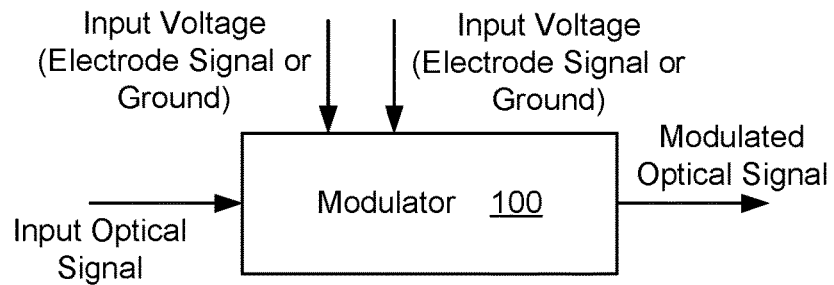
FIGS. 1A-1C depict an embodiment of an electro-optic modulator including high microwave dielectric constant regions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A conventional integrated electro-optic modulator typically includes a waveguide as well as electrodes place on opposing sides of the waveguide. The waveguide includes an electro-optic material, such as lithium niobate (LN) or lithium tantalate (LT). The waveguide is typically a ridge waveguide, including a ridge of electro-optic material that is raised up above a slab of the same electro-optic material. A cladding layer typically resides on the waveguide and electrodes. A microwave signal in the electrodes generates an electric field at the waveguide that changes the index of refraction of the waveguide and, therefore, modulates the optical signal carried by the waveguide.

The waveguide is capable both of confining the optical mode of the optical signal and responding to an electric field produced by the microwave signal in the electrodes. The optical index of refraction of the cladding is typically less than the waveguide optical index of refraction. For example, silicon dioxide may be used for the cladding layer, while LN and/or LT may be used for the waveguide. A high contrast in the waveguide and cladding optical indices of refraction aids in allowing the waveguide to reduce the volume of the optical mode. Thus, the optical mode is contained in the region of and near the ridge. Improved containment the optical mode allows the electrodes to be placed closer to each other. This configuration increases the electric field at the waveguide without inducing significant optical loss from interactions of the optical signal with the metal electrodes.

In addition to the low optical index of refraction, the cladding layer also typically has a low microwave dielectric constant. For example, the microwave dielectric constant for silicon dioxide is typically approximately 3.8. The electro-optic materials typically have a high microwave dielectric constant. For example, LN and LT have a microwave dielectric constant of approximately thirty. The contrast in microwave dielectric constant at the sides of the ridge waveguide partially blocks microwave from penetrating efficiently into the optical mode region (i.e. reduces the electro-optic effect and, therefore, modulation). However, the ridge is used to provide the optical refractive index contrast that supports optical confinement. In order to mitigate this, the slab of electro-optic materials is used. Thus, as indicated above, the waveguide is typically a ridge waveguide. The slab aids in directing the electric field produced by the electrodes to the waveguide/ridge. Although the presence of the slab aids in improving the efficiency of the modulator, an electro-optic device having improved microwave and optical performance is still desired.

An optical device including a waveguide, electrodes, and a connecting dielectric is described. The waveguide includes or consists of an electro-optic material having a waveguide optical refractive index and a waveguide microwave dielectric constant. The waveguide may be a ridge waveguide or a channel waveguide. The electrodes include a first electrode and a second electrode. The waveguide is between the first electrode and the second electrode. At least a portion of the connecting dielectric is between the waveguide and electrodes. The connecting dielectric has a microwave dielectric constant not less than the waveguide microwave dielectric constant. In some embodiments, the microwave dielectric constant of the connecting dielectric is greater than the waveguide microwave dielectric constant. The connecting dielectric may include multiple layers. At least one of the layers has a layer microwave dielectric that is at least the microwave dielectric constant. In some embodiments, some layer(s) of the connecting dielectric may have a lower microwave dielectric constant, while other layers have a higher microwave dielectric constant. The connecting dielectric may include one or more of titanium dioxide (which may be doped to other stoichiometries such as oxygen poor titanium dioxide), barium titanate (BTO), lead zirconate titanate (PZT), barium strontium titanate, strontium titanate, and/or conjugated polymers such as polyacene radical quinone type polymers and polymer-ceramic composites. The optical device may also include cladding that resides on the waveguide and has a cladding optical refractive index less than the waveguide optical refractive index.

In some embodiments, a first portion of the connecting dielectric resides between the plurality of electrodes and a substrate. The optical device may also include an interlayer between the first portion of the connecting dielectric and the electrodes. In some embodiments, the waveguide has a height. The connecting dielectric may extend at least to the height of the waveguide. In such embodiments, the connecting dielectric has an optical refractive index less than the waveguide optical refractive index.

An optical device comprising a waveguide, electrodes, and a connecting dielectric is described. The waveguide includes a first electro-optic material having a waveguide optical refractive index and a waveguide microwave dielectric constant. The electrodes include a first electrode and a second electrode. The waveguide is between the first electrode and the second electrode. The connecting dielectric is configured to direct an electric field generated by a signal in at least one of the electrodes to the waveguide. The connecting dielectric includes a second electro-optic material different from the first electro-optic material. The connecting dielectric has a microwave dielectric constant not less than the waveguide microwave dielectric constant. The optical device may also include cladding that is on the waveguide and has a cladding optical refractive index less than the waveguide optical refractive index.

A method for fabricating an optical device is also described. The method includes providing a waveguide including an electro-optic material having a waveguide optical refractive index and a waveguide microwave dielectric constant. In some embodiments, providing the waveguide includes providing a channel waveguide or providing a ridge waveguide. Electrodes are also provided. The electrodes include a first electrode and a second electrode. The waveguide is between the first and second electrodes. The method also includes providing a connecting dielectric. At least a portion of the connecting dielectric is between the waveguide and electrodes. The connecting dielectric has a microwave dielectric constant not less than the waveguide microwave dielectric constant. The connecting dielectric may include at least one of titanium dioxide, BTO, PZT, barium strontium titanate, strontium titanate, and/or conjugated polymers such as polyacene radical quinone type polymers and polymer-ceramic composites. In some embodiments, the microwave dielectric constant is greater than the waveguide microwave dielectric constant. In some embodiments, the method includes providing cladding that is on the waveguide and has a cladding optical refractive index less than the waveguide optical refractive index.

In some embodiments, providing the connecting dielectric includes configuring the connecting dielectric such that a first portion of the connecting dielectric resides between the plurality of electrodes and a substrate. In some such embodiments, an interlayer is provided between the first portion of the connecting dielectric and the electrodes.

In some embodiments, the waveguide has a height. In such embodiments, providing the connecting dielectric includes configuring the connecting dielectric to extend at least to the height of the waveguide. In such embodiments, the connecting dielectric has an optical refractive index less than the waveguide optical refractive index. In some embodiments, providing the connecting dielectric includes providing a plurality of layers. At least one of the layers has a microwave dielectric constant that is greater than or equal to the microwave dielectric constant of the connecting dielectric.

Figure 1B:
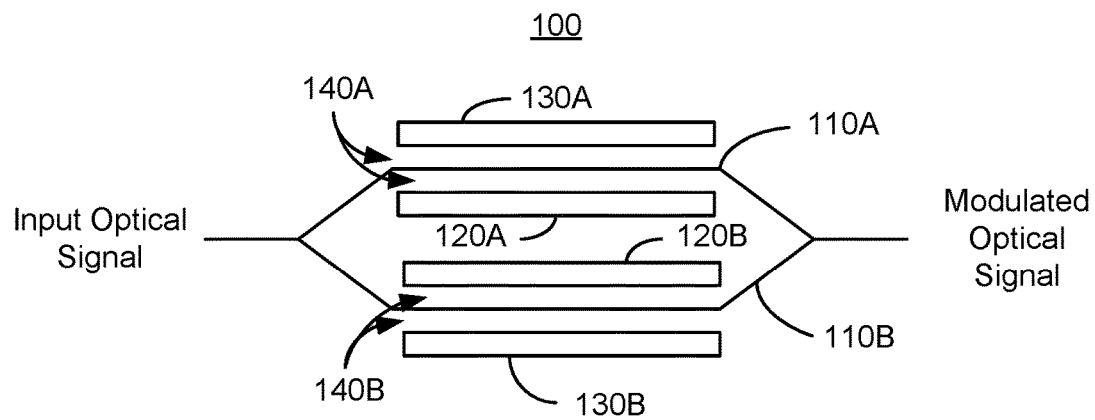
Figure 1C:
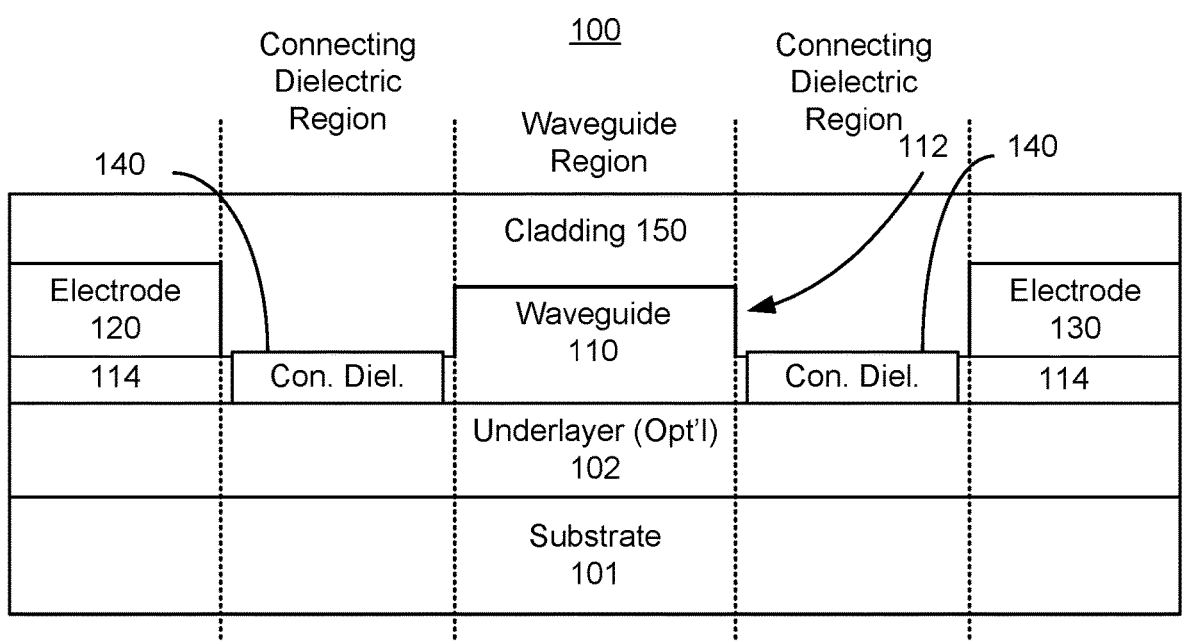

FIGS. 1A-1C depict an embodiment of an electro-optic modulator 100 including high microwave dielectric constant regions. FIG. 1A is a block diagram of optical modulator 100. FIG. 1B is a plan view of an embodiment of optical modulator 100. FIG. 1C is a cross-sectional view of a portion of an embodiment of optical modulator 100. Optical modulator 100 may be an optical modulator with an electro-optic response (e.g. in picometers per volt) in the thin film plane (e.g. x-cut or y-cut lithium niobate). However, optical modulator 100 may be an optical modulator with an electro-optic response (e.g. in picometers per volt) out of plane of the thin film plane (e.g. z-cut lithium niobate). As used herein, an x-cut or y-cut modulator is one which has an electro-optic effect in the thin film plane (e.g. even if materials such as lithium niobate are not used). Similarly, as used herein, a z-cut optical modulator has an electro-optic effect out of (e.g. perpendicular to) the thin film plane (e.g. even if materials such as lithium niobate are not used). FIGS. 1B-1C are not to scale. Other configurations are possible. For example, optical devices having a different number of waveguides, other and/or additional waveguide components such as splitters and branches (which split a waveguide into multiple waveguides), and/or a different number of electrodes are possible.

Referring to FIG. 1A, an optical signal is input to optical modulator 100. For example, the optical signal may be provided by one or more lasers. An electrode signal having a voltage is also input to modulator 100. The electrode signal may be from a driver (not shown) that is on-chip or off-chip. In some embodiments, the frequency of the electrode signal is in the microwave range. Consequently, the terms microwave signal and electrode signal are used synonymously herein. Optical modulator 100 utilizes the electrode signal to modulate the optical signal and outputs a modulated optical signal.

Referring to FIG. 1B, optical modulator 100 includes a waveguide having arms 110A and 110B (collectively or generically waveguide 110), electrodes 120A and 120B (collectively or generically electrodes 120), electrodes 130A and 130B (collectively or generically electrodes 130), and connecting dielectrics 140A and 140B (collectively or generically connecting dielectric 140) that have a microwave dielectric constant(s) greater than that of waveguide 110. FIG. 1C can be considered to depict either arm 110A or 110B of optical modulator 100. Referring to FIGS. 1B and 1C, substrate 101 and underlayer(s) 102 are also shown. For example, substrate 101 may include a silicon wafer and underlayer(s) 102 may include a silicon dioxide layer between the silicon wafer and waveguide 110. In some embodiments, underlayer 102 includes one or more of silicon dioxide, aluminum oxide, silicon oxynitride, Benzocyclobutene (BCB), and photosensitive polymers such as SU-8, which have a low optical index of refraction. In some embodiments, underlayer 102 provided is desired to be thick. For example, underlayer 102 may be at least three micrometers thick and not more than one hundred micrometers thick. In some embodiments, underlayer 102 is at least ten micrometers thick. Underlayer(s) 102 may be omitted in some embodiments. Other substrates and/or other underlayer(s) may be used in some embodiments. Further, other configurations of substrate and/or underlayers may be used in some embodiments.

Waveguide 110 is used to transmit an optical signal. More specifically, waveguide 110 receives an input optical signal and outputs a modulated optical signal. In some embodiments, waveguide 110 is a ridge waveguide. In such embodiments, waveguide 110 includes ridge 112 (also termed a waveguide because the optical mode is confined using ridge 121) and slab 114. In the embodiment, slab 114 and ridge 112 are formed from the same material (e.g. from the same thin film). For example, ridge 112 may be formed by depositing a layer of electro-optic material(s), masking the region corresponding to ridge 112, and etching the layer. Slab 114 and ridge 112 remain after etching. A portion of slab 114 may be removed to form connecting dielectrics 140. Thus, although termed part of waveguide 110, in some embodiments, some or all of slab 114 may be physically separate from the portion of waveguide 110 transmitting the optical mode and/or may not carry the optical signal. Waveguide 110 is thus shown as having ridge 112 and a small portion of slab 114 adjoining ridge 112. In other embodiments, waveguide 110 may be a channel waveguide. In such embodiments, slab 114 and/or a portion of slab 114 adjacent to ridge 112/waveguide 110 is omitted.

For simplicity, ridge 112 is depicted as a having a generally rectangular shape. Other shapes, such as a trapezoid, are possible. The optical mode for the optical signal carried by waveguide 110 is substantially confined to ridge 112. For example, the optical mode for the optical signal carried by waveguide 110 does not extend to electrodes 120 and 130. Waveguide 110 includes at least one electro-optic material possessing an electro-optic effect and may have a total optical loss of not more than ten dB through modulator 100 (e.g. when biased at maximum transmission and as a maximum loss). In some embodiments, the electro-optic material(s) are nonlinear. The total optical loss is the optical loss in a waveguide through a single continuous electrode region (e.g. as opposed to multiple devices cascaded together), such as is shown in FIGS. 1A-1C. In some embodiments, waveguide 110 has a total optical loss of not more than 8 dB through modulator 100. In some embodiments, the total optical loss is not more than 4 dB. In some embodiments, waveguide 110 has an optical loss of not more than 3.0 dB/cm (e.g. on average). In some embodiments, the nonlinear electro-optic material in waveguide 110/112 has an optical loss of not more than 2.0 dB/cm. In some such embodiments, waveguide 110/112 has an optical loss of not more than 1.0 dB/cm. In some embodiments, waveguide 110/112 has an optical loss of not more than 0.5 dB/cm.

The electro-optic material(s) used for waveguide 110/112 may be nonlinear electro-optic materials. As used herein, a nonlinear electro-optic material exhibits the electro-optic effect and has an effect that is at least (e.g. greater than or equal to) 5 picometer/volt. In some embodiments, the nonlinear electro-optic material has an effect that is at least 10 picometer/volt. In some such embodiments nonlinear electro-optic material has an effect of at least 20 picometer/volt. The nonlinear electro-optic material experiences a change in index of refraction in response to an applied electric field. In some embodiments, the nonlinear electro-optic material is ferroelectric. In some embodiments, the electro-optic effect includes a change in index of refraction in an applied electric field due to the Pockels effect. Thus, in some embodiments, electro-optic materials possessing the electro-optic effect in one or more the ranges described herein are considered nonlinear electro-optic materials regardless of whether the effect is linearly or nonlinearly dependent on the applied electric field. The nonlinear electro-optic material may be a non-centrosymmetric material. Therefore, the nonlinear electro-optic material may be piezoelectric.

In some embodiments, the electro-optic material(s) in waveguide 110 includes lithium niobate (LN) and/or lithium tantalate (LT). In some embodiments, the nonlinear electro-optic material for waveguide 110 consists of LN. In some embodiments, the nonlinear electro-optic material for waveguide 110 consists of LT. Such nonlinear electro-optic materials may have inert chemical etching reactions for conventional etching using chemicals such as fluorine, chlorine or bromine compounds. In some embodiments, the nonlinear electro-optic material(s) include one or more of LN, LT, potassium niobate, gallium arsenide, potassium titanyl phosphate, lead zirconate titanate, and barium titanate. In other embodiments, other nonlinear electro-optic materials having analogous optical characteristics may be used. The microwave dielectric constants of the electro-optic material(s) used for waveguide 110 may be high. For example, LN has a microwave dielectric constant of approximately 30. LT has a microwave dielectric constant of approximately 30. Gallium arsenide has a microwave dielectric constant of approximately 12.

Waveguide 110 may have a different configuration in some embodiments. For example, waveguide 110 may omit slab 114 or reduce the size of slab 114. Ridge 112 may have another configuration. For example, ridge 112 may be trapezoidal, semicircular, stacked rectangular and/or have another geometry that guides the optical signal in a manner analogous to that which is described herein. Other and/or additional materials may be used. In some embodiments, different portions of waveguide 110 are formed from different materials. For example, slab 114 and ridge 112 may be formed of different materials. Slab 114 may include a nonlinear electro-optic material such as LN and/or LT, while ridge 112 may be formed of a passive material such as silicon and/or silicon nitride. In some embodiments, ridge 112 may be located below slab 114 (e.g. ridge 112 may be between slab 114 and an underlying substrate 101). Similarly, various other optical components may be incorporated into waveguide 110 to provide the desired phase modulation, polarization modulation, intensity modulation, IQ modulation, other modulation and/or other functionality. For example, waveguide 110 may have wider portion(s) (not shown in FIGS. 1A-1C) for accommodating multiple modes. Thus, waveguide 110, as well as electrodes 120 and 130, may be configured to provide the desired functionality.

In some embodiments, the electro-optic material for waveguide 110 is formed as a thin film. For example, the thin film may have a thickness (e.g. of ridge 112) of not more than three multiplied by the optical wavelengths for the optical signal carried in waveguide 110 before processing. In some embodiments, the thin film has a thickness (e.g. of ridge 112) of not more than two multiplied by the optical wavelengths. In some embodiments, the nonlinear electro-optic material has a thickness of not more than one multiplied by the optical wavelength. In some embodiments, the nonlinear electro-optic material has a thickness of not more than 0.5 multiplied by the optical wavelengths. For example, the thin film may have a total thickness of not more than three micrometers and at least two hundred nanometers as-deposited. In some embodiment, the thin film has a total thickness of not more than two micrometers. In some embodiment, the thin film has a total thickness of not more than one micrometer. In some embodiments, ridge 112 is at least four hundred nanometers and not more than eight hundred nanometers thick, while slab 114 is at least two hundred nanometers and not more than five hundred nanometers thick.

The electro-optic material may be fabricated into waveguide 110 utilizing photolithography. For example, ultraviolet (UV) and/or deep ultraviolet (DUV) photolithography may be used to pattern masks for the nonlinear electro-optic material. For DUV photolithography, the wavelength of light used is typically less than two hundred and fifty nanometers. To fabricate the waveguide, the thin film nonlinear electro-optic material may undergo a physical etch, for example using dry etching, reactive ion etching (RIE), inductively coupled plasma RIE. In some embodiments, a chemical etch and/or electron beam etch may be used. Waveguide 110 may thus have improved surface roughness. For example, the sidewall(s) of ridge 112 may have reduced surface roughness. For example, the short range root mean square surface roughness of a sidewall of the ridge 112 is less than ten nanometers. In some embodiments, this root mean square surface roughness is not more than five nanometers. In some cases, the short range root mean square surface roughness does not exceed two nanometers. Thus, waveguide 110 may have the optical losses in the range described above.

In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112 is on the order of a few hundred nanometers in some cases. However, other heights are possible in other embodiments. In some embodiments, the thickness of the optical guiding region (i.e. waveguide) 110/112 is not more than 0.3 multiplied by the wavelength of light being guided divided by the optical refractive index of the waveguide 110/112. In some embodiments, the thickness of waveguide 110/112 is not more than 0.5 multiplied by the wavelength of light being guided divided by the optical refractive index of the waveguide. In some embodiments, the thickness of waveguide 110 is not more than 1 multiplied by the wavelength of light being guided divided by the optical refractive index of the waveguide. In some embodiments, the thickness of waveguide 110 is not more than 2 multiplied by the wavelength of light being guided divided by the optical refractive index of the waveguide. In some embodiments, the thickness of waveguide 110 is not more than 10 multiplied by the wavelength of light being guided divided by the optical refractive index of the waveguide. However, other thicknesses may be used.

In some embodiments, the width of the waveguide (e.g. ridge) 110/112 is less than seven micrometers. In some embodiments, the width of the optical guiding region (e.g. waveguide 110/112) is less than five micrometers. In some embodiment, the width of the waveguide 110/112 is less than two micrometers. In some embodiments, the width of the waveguide 110/112 is less than one micrometer. However, other widths are possible.

A portion of waveguide 110 is proximate to electrodes 120 and 130 along the direction of transmission of the optical signal (e.g. from the input of the optical signal through waveguide 110 to the modulated optical signal output). The portion of waveguide 110 proximate to electrodes 120 and 130 may have a length greater than two centimeters. In some embodiments, the length of the portion of waveguide 110 proximate to electrodes 120 and 130 is at least 2.5 cm. In some embodiments, the length of this portion of waveguide 110 is at least three centimeters. Such lengths are possible at least in part because of the low optical losses per unit length for waveguide 110 described above. For example, waveguide 110 may have a total optical loss of not more than 10 dB through modulator 100. In some embodiments, the total optical loss is not more than 8 dB. Waveguide 110 may have a total optical loss of not more than 4 dB. In some embodiments, waveguide 110 has a total optical loss of not more than 3 dB. In some embodiments, the total optical loss is less than 2 dB. Because waveguide 110 can be made longer, the total optical modulation may be provided through the electric field generated by electrodes 120 and 130 may be larger. Further, because of the low optical losses and low microwave losses (described below), the desired optical modulation (e.g. change in index of refraction) may be achieved with a signal input to the electrode(s) 120 and/or 130 having a lower voltage. For example, $V\pi$ is the half wave voltage, or the amplitude of the input electrode signal required to shit the phase of the optical signal by $\pi$. In some embodiments, $V\pi$ is not more than six volts for signals in the 50-100 GHz range. In some embodiments, $V\pi$ is not more than three volts for signals in the 50-100 GHz range. In some embodiments, $V\pi$ is not more than two volts for signals in the 50-100 GHz range. In some embodiments, $V\pi$ is on the order of voltages provided via CMOS circuitry, for example in the range of 0.5 volts through 1.5 volts for signals in the 50-100 GHz range. For example, $V\pi$ may be not more than 1.5 volts at ten GHz. Thus, $V\pi$ is not more than 1.5 volts in some embodiments. In some such embodiments, $V\pi$ is not more than 1 volt for signals in the 50-100 GHz range. Other voltages for other frequency ranges are possible. Thus, performance of optical modulator 110 may be improved.

Further, the portion of waveguide 110 proximate to electrodes 120 and 130 has an optical mode cross-sectional area that is small. In some embodiments, the optical mode cross-sectional area is less than 3 multiplied by the square of the wavelength of the optical signal in the nonlinear electro-optic material(s) (e.g. $\lambda^2$). In some embodiments, the optical mode cross-sectional area is less than 2 multiplied by the square of the wavelength of the optical signal in the nonlinear electro-optic material(s). In some embodiments, the optical mode cross-sectional area is less than 1.5 multiplied by the square of the wavelength of the optical signal in the nonlinear electro-optic material(s). In some embodiments, the optical mode cross-sectional area is less than 4 µm². In some such embodiments, the optical mode cross-sectional area is not more than 3 µm². In some embodiments, such a small optical mode cross-sectional area may be provided using thin films and fabrication technologies described herein. The optical mode cross-sectional area may also allow for the low optical losses described herein.

Electrodes 120 and 130 apply electric fields to waveguide 110. In some embodiments, electrode(s) 120 and/or 130 include a channel region and extensions (not shown), which extend from the channel region closer to waveguide 110. Electrodes 120 and/or 130 may be formed of metal, doped semiconductor(s) and/or other materials. Electrode 120 and/or 130 may be fabricated using deposition techniques, such as electroplating, and photolithography to shape the electrode 120 and/or 130. The resulting electrode 120 and/or 130 may have a lower frequency dependent electrode loss. In some embodiments, the frequency dependent electrode power loss for a particular frequency window (e.g. at least 10 GHz) in a frequency range between DC and five hundred GHz can be as low as 0.8 dB per square root of the electrode signal frequency per centimeter, where the electrode signal frequency is measured in GHz. In some embodiments, the frequency dependent electrode power loss for the same frequency window and frequency range can be as low as 0.75 dB per square root of the electrode signal frequency per centimeter for the particular frequency window (e.g. 10 GHz or more). In some embodiments, the electrode has an absorption electrode loss. In some embodiments, the absorption electrode loss a particular frequency window (e.g. 10 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical modulator 110 may include an additional electrode, such as a DC electrode (not shown in FIGS. 1A-1C). Such an additional electrode may be used to optimize optical modulator 100 for low-frequency response. This electrode may include one or more of an electro-optic, a thermal phase shifter and or MEMS shifter.

Electrodes 120 and 130 apply a time varying electric field to waveguide 110, which alters the index of refraction of waveguide 110. To apply the electric field electrode(s) 120 and/or 130 carry an electrode signal. In some embodiments, electrode 120 carries an electrode signal, such as a microwave signal, while electrode 130 is a ground. In some embodiments, electrode 130 carries an electrode (e.g. microwave) signal, while electrode 120 is ground. In some embodiments, both electrodes 120 and 130 carry electrode signals.

Waveguide 110/112 has a high microwave dielectric constant (e.g. approximately 30 for LN and/or LT) and an optical index of refraction. Cladding 150, which may be formed of silicon dioxide or an analogous material, has a lower optical index of refraction than waveguide 110/112. For example, cladding 150 may include one or more low dielectric constant materials such as silicon dioxide (k~3.5), aluminum oxide (k~11), silicon oxynitride (k~4), Benzocyclobutene (BCB) (k~2.65), SU-8 (~3). The contrast in the optical indices of refraction between waveguide 110/112 and cladding 150 aids in allowing waveguide 110/112 to confine the mode size of the optical signal transmitted via waveguide 110/112. However, cladding 150 also has a significantly lower microwave dielectric constant than waveguide 110/112. Thus, the electric field generated by electrodes 120 and 130 may not be concentrated at waveguide 110/112.

Connecting dielectrics 140 provide mechanisms to efficiently interface the electrodes and waveguide 110/112 to improve electro-optic modulation efficiency. Connecting dielectrics 140 each has a high microwave dielectric constant. More specifically, each connecting dielectric 140 has a microwave dielectric that is at least as high as, and in some embodiments greater than, the waveguide microwave dielectric for waveguide 110/112. For example, connecting dielectric(s) 140 may include one or more of the following very high-microwave dielectric constant material(s): titanium dioxide (which may be doped such that the titanium dioxide is oxygen poor or oxygen rich), barium titanate (BTO), lead zirconate titanate (PZT), barium strontium titanate, strontium titanate, certain conjugated polymers, compounded or structured materials including of layers or mixtures of materials with high microwave dielectric constant values. For example, in some embodiments, the microwave dielectric constant may be greater than eighty.

Connecting dielectrics 140 are on at least one, and more generally two sides of the waveguide 110/112. In optical modulator 100 shown in FIGS. 1A-1C, connecting dielectrics 140 are on two sides of waveguide 110/112. Because connecting dielectric 140 has a higher microwave dielectric constant than optical waveguide 110/112, connecting dielectric 140 focuses more electric field in the optical guiding region in and around waveguide 110/112. Stated differently, the electric field generated by the microwave signal in electrode(s) 120 and/or 130 is more effectively directed to the electro-optic material of waveguide 110/112. A higher magnitude of electric field may thus reach waveguide 110/112. This allows for a larger optical index of refraction change in waveguide 110/112 and higher optical signal modulation for a given magnitude signal in electrode(s) 120 and/or 130. Electro-optic modulation efficiency may thereby be increased.

In addition, connecting dielectric 140 may provide sufficient lateral optical confinement to waveguide 110/112 to support waveguiding (e.g. confinement and transmission of the optical signal. In some embodiments, connecting dielectrics 140 have an optical index of refraction that is not more than ten percent higher than the optical index of refraction of waveguide 110/112. For example, in some embodiments, connecting dielectric 140 has an optical index of refraction that is less than or equal to the waveguide optical index of refraction for waveguide 110/112. In some embodiments, the optical refractive index in connecting dielectric 140 is higher than the optical refractive index in the waveguide 110/112. If connecting dielectric 140 has a higher optical refractive index than waveguide 110/112 and if connecting dielectric 140 has about the same thickness as or is thicker than the waveguide 110/112, the optical signal may leak from sides of waveguide 110/112 and no longer be guided. In such embodiments, therefore, connecting dielectric 140 may have a thickness less than that of the waveguide ridge 110 to facilitate optical guiding. In some embodiments, connecting dielectrics 140 may have lower optical refractive index and higher microwave dielectric than waveguide 110/112. Thus, confinement of the optical mode in waveguide 110/112 may be maintained even for thicker connecting dielectrics 140. In this case, connecting dielectric 140 may be thicker, about the same thickness, as or thinner than waveguide 110/112. This is because the difference in optical indices of refraction allows for optical confinement. In the embodiment depicted in FIG. 1C, connecting dielectrics 140 are thinner than waveguide 110/112. Thus, the optical index of refraction of connecting dielectrics 140 may be greater than, the same as, or less than the optical index of refraction of waveguide/ motion 112.

For example, in some embodiments, the thickness of connecting dielectric 140 is not more than 0.95 multiplied by and at least 0.02 multiplied by the thickness of the waveguide 110/112. In some embodiments, the thickness of connecting dielectric 140 is not more than 0.8 times and at least 0.1 multiplied by the thickness of the waveguide 110/112. In some embodiments, the thickness of connecting dielectric 140 is not more than 0.5 times and at least 0.2 multiplied by the thickness of the waveguide region 110. In some embodiments, the optical refractive index of the connecting dielectrics 140 (having high microwave dielectric constants) is less than the optical refractive index of the waveguide 110/112. In such embodiments, the thickness of connecting dielectric 140 may be at least 0.02 multiplied by the thickness of the waveguide/ridge 110/112. In some embodiments, the thickness of connecting dielectric 140 is at least 0.1 multiplied by the thickness of the waveguide 110/112. In some embodiments, the thickness of connecting dielectric 140 is at least 0.2 multiplied by the thickness of waveguide 110/112.

Another way to view optical modulator 100 and its electro-optic modulation efficiency is related to the electric field strength in the high dielectric constant region corresponding to 112/110 for a given voltage difference applied on electrodes 120 and/or 130. The electric field strength is positively correlated to the voltage gradient on the regions for connecting dielectrics 140 (between dotted lines including connecting dielectrics) and high dielectric constant regions corresponding to waveguide 110/112 (between dotted lines including waveguide 110/112) which can be modeled by simple capacitors in series configuration. In conventional devices, the high microwave dielectric constant for waveguide 110/112 normally indicates non-maximized electric field strength in waveguide 112 because the high dielectric constant results in lower capacitance for the region including the waveguide as compared to adjacent regions. The embodiments described herein increase the field strength in the capacitor corresponding to waveguide 110/ 112 by reducing capacitances of the regions of connecting dielectrics 140. Stated differently, the capacitance of the capacitor corresponding to the region including waveguide 110/112 is closer to the capacitances of the capacitors corresponding to connecting dielectrics 140 because of the high microwave dielectric constant of connecting dielectrics. Thus, the electric field strength at waveguide 110/112 may be enhanced.

In operation, an optical signal is provided to waveguide 110 and split into arms 110A and 110B. A microwave (or other frequency) signal provided to electrode(s) 120A and 120B and/or electrodes 130A and 130B. Consequently, an electric field is developed between electrodes 120A and 130A and between electrodes 120B and 130B. Because of the presence of connecting dielectrics 140, the electric field due to the microwave signal in electrodes 120 and/or 130 is concentrated in the waveguide 110/112. Thus, a particular voltage amplitude microwave signal may produce a higher electric field at each waveguide 110/112 (e.g. at each arm 110A and 110B). Thus, a higher change in the optical index of refraction of each waveguide 110/112 may be achieved. The optical signal traveling through waveguide 110 is thus modulated. The modulated optical signals from arms 110A and 110B are combined and output.

Thus, optical modulator 100, as well as analogous electro-optic devices, have improved performance. Because of the use of thin film materials such as LN and/or LT for waveguide 110/112, a larger optical modulation as well as lower optical losses may be achieved. Use of connecting dielectrics 140 improves the concentration of the electric field at waveguide 110/112 and, therefore, further may enhance optical modulation. Consequently, optical efficiency of optical modulator 100 may be further improved.

The embodiments described herein include any geometry/ other geometries that correspond to the embodiment described herein. This includes variations on implementation details. Other embodiments are briefly described below. Any combination and permutations of the variations, including incorporating portions of the embodiments described herein are possible.

Figure 2:
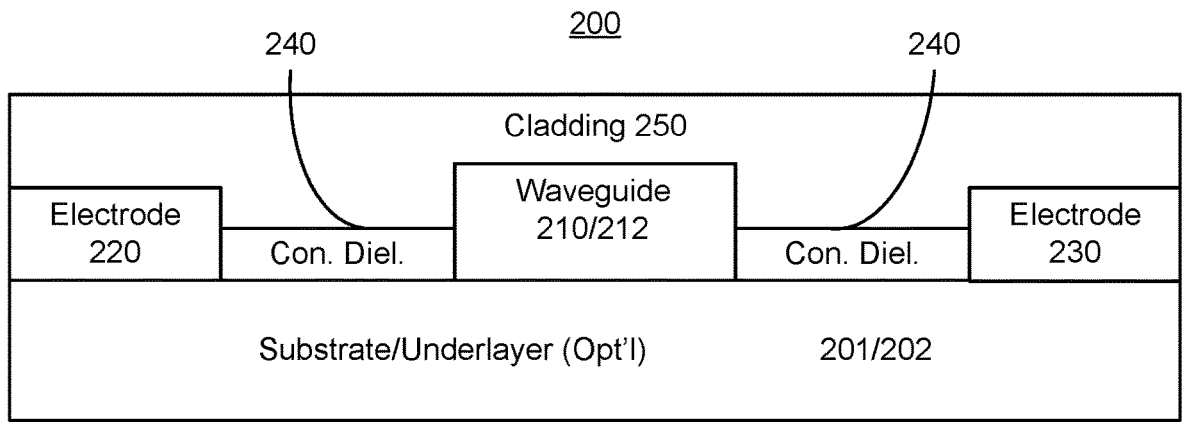
FIGS. 2-20 depict embodiments of electro-optic devices including high dielectric constant regions.

FIGS. 2-20 depict embodiments of electro-optic devices including high dielectric constant regions. FIG. 2 is a cross-sectional view of a portion of an embodiment of electro-optic device 200. For clarity, FIG. 2 is not to scale. Electro-optic device 200 may be a modulator. For example, FIG. 2 may depict a portion of one arm (e.g. analogous to arm 110A or 110B) of electro-optic device 200. In some embodiments, electro-optic device 200 may be another device. Electro-optic device 200 is analogous to electro-optic device 100. Electro-optic device 200 includes waveguide 210/212, electrodes 220 and 230, connecting dielectrics 240, and cladding 250 on substrate/underlayer(s) 201/ 202 that are analogous to waveguide 110/112, electrodes 120 and 130, connecting dielectrics 140, and cladding 150 on substrate/underlayer(s) 101/102, respectively. Consequently, the materials, function, and configuration of waveguide 210/212, electrodes 220 and 230, connecting dielectrics 240, cladding 250, and substrate/underlayer(s) 201/202 may be analogous to waveguide 110/112, electrodes 120 and 130, connecting dielectrics 140, cladding 150, and substrate/ underlayer(s) 101/102, respectively.

Waveguide 210/212 is a channel waveguide. Thus, slab 114 is omitted. Connecting dielectrics 240 may reside on one or both sides of waveguide 210/212. In the embodiment shown, connecting dielectrics 240 are thinner than waveguide 210/212.

Electro-optic device 200 may share the benefits of electro-optic device 100. Because of the use of thin film materials such as LN and/or LT for waveguide 210/212, a larger optical modulation as well as lower optical losses may be achieved. Use of connecting dielectrics 240 improves the concentration of the electric field at waveguide 210/212 and, therefore, further may enhance optical modulation. Consequently, optical efficiency of electro-optic device 200 may be further improved.

Figure 3:
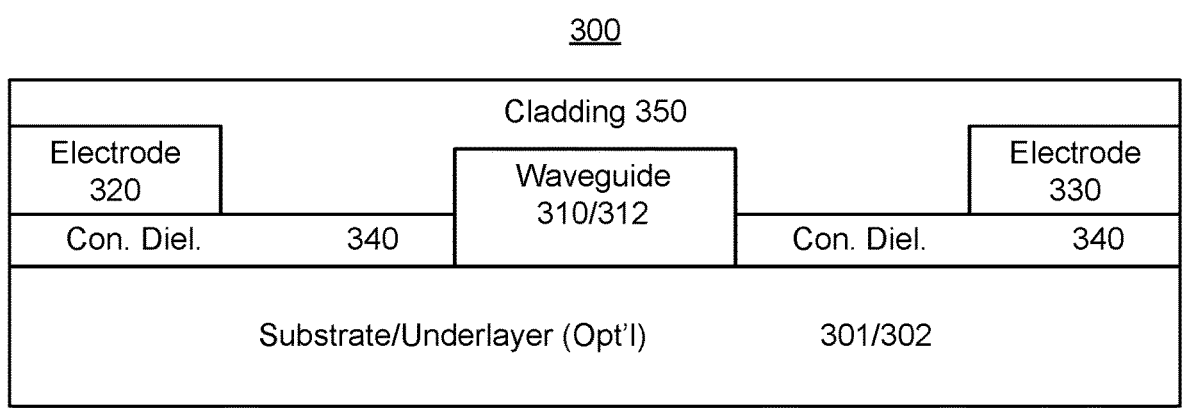

FIG. 3 is a cross-sectional view of a portion of an embodiment of electro-optic device 300. For clarity, FIG. 3 is not to scale. Electro-optic device 300 may be a modulator. For example, FIG. 3 may depict a portion of one arm (e.g. analogous to arm 110A or 110B) of electro-optic device 300. In some embodiments, electro-optic device 300 may be another device. Electro-optic device 300 is analogous to electro-optic device 100. Electro-optic device 300 includes waveguide 310/312, electrodes 320 and 330, connecting dielectrics 340, and cladding 350 on substrate/underlayer(s) 301/302 that are analogous to waveguide 110/112, electrodes 120 and 130, connecting dielectrics 140, and cladding 150 on substrate/underlayer(s) 101/102, respectively. Consequently, the materials, function, and configuration of waveguide 310/312, electrodes 320 and 330, connecting dielectrics 340, cladding 350, and substrate/underlayer(s)

301/302 may be analogous to waveguide 110/112, electrodes 120 and 130, connecting dielectrics 140, cladding 150, and substrate/underlayer(s) 101/102, respectively.

Waveguide 310/312 is a channel waveguide. Thus, slab 114 is omitted. Connecting dielectrics 340 may reside on one or both sides of waveguide 310/312. In the embodiment shown, connecting dielectrics 340 are thinner than waveguide 310/312. Further, connecting dielectrics 340 extend under, and possibly past, electrodes 320 and 330. Thus, electrodes 320 and 330 are fabricated on connecting dielectrics 340.

Electro-optic device 300 may share the benefits of electro-optic device 100. Because of the use of thin film materials such as LN and/or LT for waveguide 310/312, a larger optical modulation as well as lower optical losses may be achieved. Use of connecting dielectrics 340 improves the concentration of the electric field at waveguide 310/312 and, therefore, further may enhance optical modulation. Consequently, optical efficiency of electro-optic device 300 may be further improved.

Figure 4:
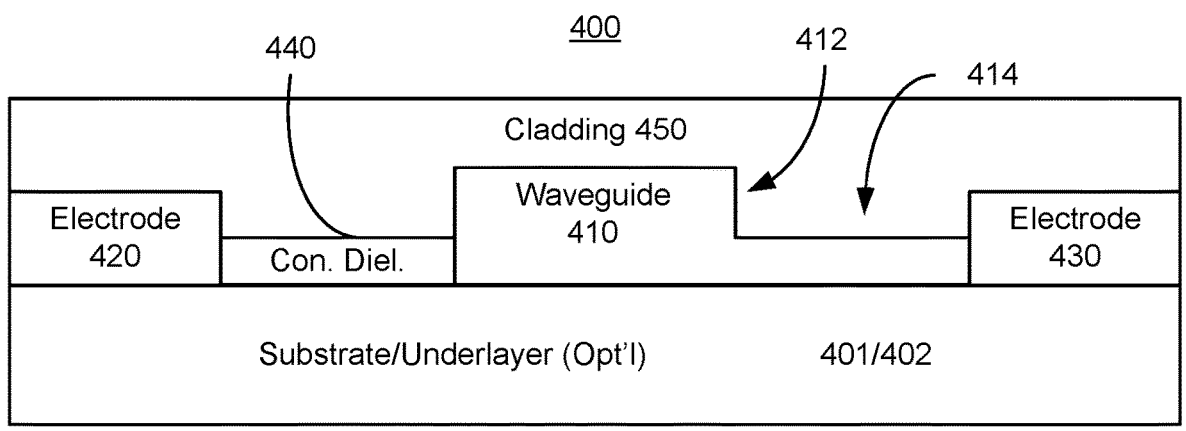

FIG. 4 is a cross-sectional view of a portion of an embodiment of electro-optic device 400. For clarity, FIG. 4 is not to scale. Electro-optic device 400 may be a modulator. For example, FIG. 4 may depict a portion of one arm (e.g. analogous to arm 110A or 110B) of electro-optic device 400. In some embodiments, electro-optic device 400 may be another device. Electro-optic device 400 is analogous to electro-optic device 100. Electro-optic device 400 includes waveguide 410/412, slab 414, electrodes 420 and 430, connecting dielectric 440, and cladding 450 on substrate/underlayer(s) 401/402 that are analogous to waveguide 110/112, slab 114 electrodes 120 and 130, connecting dielectrics 140, and cladding 150 on substrate/underlayer(s) 101/102, respectively. Consequently, the materials, function, and configuration of waveguide 410/412, slab 414 electrodes 420 and 430, connecting dielectric 440, cladding 450, and substrate/underlayer(s) 401/302 may be analogous to waveguide 110/112, slab 114, electrodes 120 and 130, connecting dielectrics 140, cladding 150, and substrate/underlayer(s) 101/102, respectively.

Waveguide 410/412 is a ridge waveguide. Thus, slab 414 is present. However, waveguide 414 and thus, connecting dielectric 414 are asymmetric. Connecting dielectric 440 resides on only one side of waveguide 410/412. In the embodiment shown, connecting dielectric 440 are thinner than waveguide 410/412. Although shown as terminated at electrode 420, in some embodiments, connecting dielectric 440 extends under, and possibly past, electrodes 420. In some embodiments, the positions of slab 414 and connecting dielectrics may be switched.

Electro-optic device 400 may share the benefits of electro-optic device 100. Because of the use of thin film materials such as LN and/or LT for waveguide 410/412, a larger optical modulation as well as lower optical losses may be achieved. Use of connecting dielectrics 440 improves the concentration of the electric field at waveguide 410/412 and, therefore, further may enhance optical modulation. Consequently, optical efficiency of electro-optic device 400 may be further improved.

Figure 5:
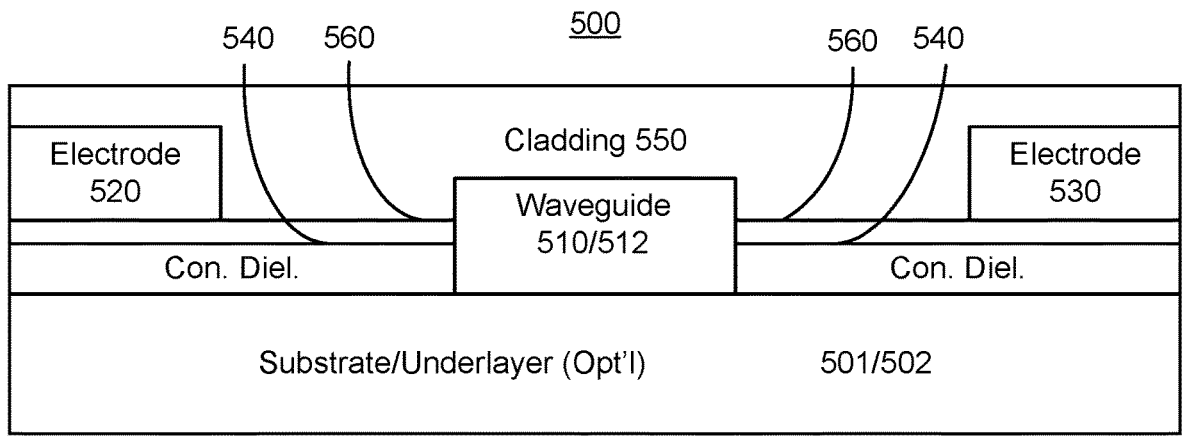

FIG. 5 is a cross-sectional view of a portion of an embodiment of electro-optic device 500. For clarity, FIG. 5 is not to scale. Electro-optic device 500 may be a modulator. For example, FIG. 5 may depict a portion of one arm (e.g. analogous to arm 110A or 110B) of electro-optic device 500. In some embodiments, electro-optic device 500 may be another device. Electro-optic device 500 is analogous to electro-optic device 100. Electro-optic device 500 includes waveguide 510/512, electrodes 520 and 530, connecting dielectrics 540, and cladding 550 on substrate/underlayer(s) 501/502 that are analogous to waveguide 110/112, electrodes 120 and 130, connecting dielectrics 140, and cladding 150 on substrate/underlayer(s) 101/102, respectively. Consequently, the materials, function, and configuration of waveguide 510/512, electrodes 520 and 530, connecting dielectrics 540, cladding 550, and substrate/underlayer(s) 501/502 may be analogous to waveguide 110/112, electrodes 120 and 130, connecting dielectrics 140, cladding 150, and substrate/underlayer(s) 101/102, respectively.

Waveguide 510/512 is a channel waveguide. Thus, slab 114 is omitted. In other embodiments, waveguide 510/512 might be a ridge waveguide. Connecting dielectrics 540 may reside on one or both sides of waveguide 510/512. In the embodiment shown, connecting dielectrics 540 are thinner than waveguide 510/512. Further, connecting dielectrics 540 extend under, and possibly past, electrodes 520 and 530.

Also shown is buffer layer 560. Buffer layer 560 may include or consist of at least one of silicon dioxide, doped silicon dioxide, aluminum oxide, silicon nitride, and/or other low refractive index material(s). Thus, electrodes 520 and 530 are fabricated on connecting dielectrics 540 and buffer layer 560.

Electro-optic device 500 may share the benefits of electro-optic device 100. Because of the use of thin film materials such as LN and/or LT for waveguide 510/512, a larger optical modulation as well as lower optical losses may be achieved. Use of connecting dielectrics 540 improves the concentration of the electric field at waveguide 510/512 and, therefore, further may enhance optical modulation. Consequently, optical efficiency of electro-optic device 500 may be further improved.

Figure 6:
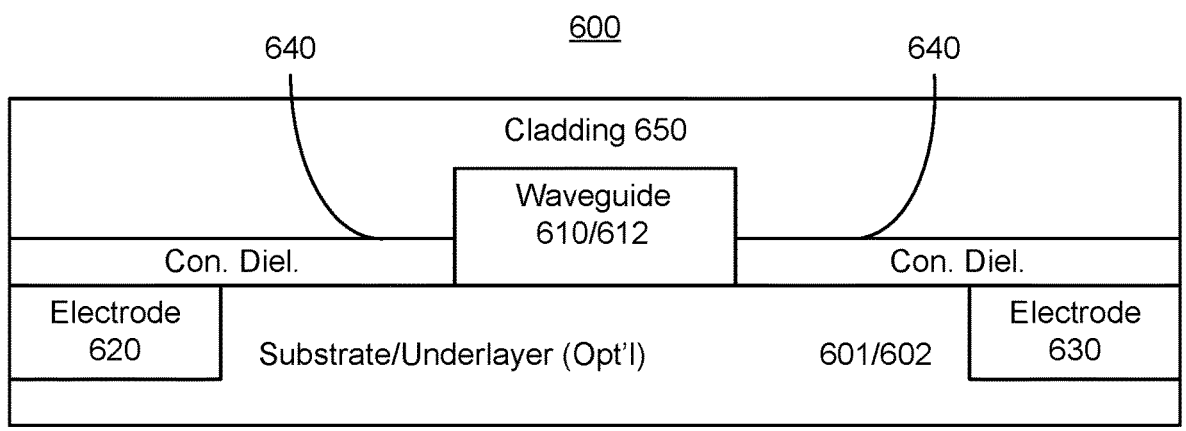

FIG. 6 is a cross-sectional view of a portion of an embodiment of electro-optic device 600. For clarity, FIG. 6 is not to scale. Electro-optic device 600 may be a modulator. For example, FIG. 6 may depict a portion of one arm (e.g. analogous to arm 110A or 110B) of electro-optic device 600. In some embodiments, electro-optic device 600 may be another device. Electro-optic device 600 is analogous to electro-optic device 100. Electro-optic device 600 includes waveguide 610/612, electrodes 620 and 630, connecting dielectrics 640, and cladding 650 on substrate/underlayer(s) 601/602 that are analogous to waveguide 110/112, electrodes 120 and 130, connecting dielectrics 140, and cladding 150 on substrate/underlayer(s) 101/102, respectively. Consequently, the materials, function, and configuration of waveguide 610/612, electrodes 620 and 630, connecting dielectrics 640, cladding 650, and substrate/underlayer(s) 601/602 may be analogous to waveguide 110/112, electrodes 120 and 130, connecting dielectrics 140, cladding 150, and substrate/underlayer(s) 101/102, respectively.

Waveguide 610/612 is a channel waveguide. Thus, slab 114 is omitted. Connecting dielectrics 640 may reside on one or both sides of waveguide 610/612. In the embodiment shown, connecting dielectrics 640 are thinner than waveguide 610/612. Further, connecting dielectrics 640 extend on, and possibly past, electrodes 620 and 630. In the embodiment shown, electrodes 620 and 630 are buried, below connecting dielectrics 640. Thus, connecting dielectrics 640 are fabricated on electrodes 620 and 630.

Electro-optic device 600 may share the benefits of electro-optic device 100. Because of the use of thin film materials such as LN and/or LT for waveguide 610/612, a larger optical modulation as well as lower optical losses may be achieved. Use of connecting dielectrics 640 improves the concentration of the electric field at waveguide 610/612 and, therefore, further may enhance optical modulation. Consequently, optical efficiency of electro-optic device 600 may be further improved.

Figure 7:
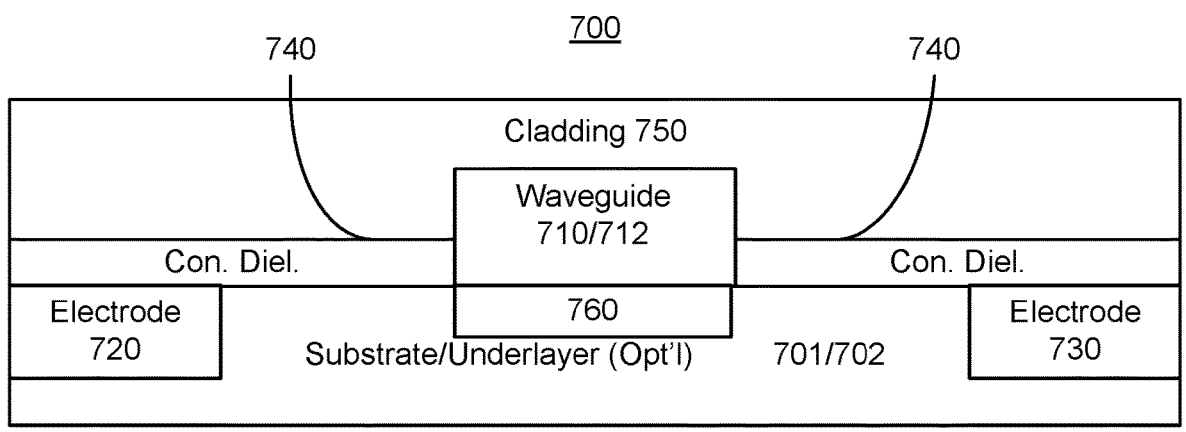

FIG. 7 is a cross-sectional view of a portion of an embodiment of electro-optic device 700. For clarity, FIG. 7 is not to scale. Electro-optic device 700 may be a modulator. For example, FIG. 7 may depict a portion of one arm (e.g. analogous to arm 110A or 110B) of electro-optic device 700. In some embodiments, electro-optic device 700 may be another device. Electro-optic device 700 is analogous to electro-optic device 100. Electro-optic device 700 includes waveguide 710/712, electrodes 720 and 730, connecting dielectrics 740, and cladding 750 on substrate/underlayer(s) 701/702 that are analogous to waveguide 110/112, electrodes 120 and 130, connecting dielectrics 140, and cladding 150 on substrate/underlayer(s) 101/102, respectively. Consequently, the materials, function, and configuration of waveguide 710/712, electrodes 720 and 730, connecting dielectrics 740, cladding 750, and substrate/underlayer(s) 701/702 may be analogous to waveguide 110/112, electrodes 120 and 130, connecting dielectrics 140, cladding 150, and substrate/underlayer(s) 101/102, respectively.

Waveguide 710/712 is a channel waveguide. Thus, slab 114 is omitted. Connecting dielectrics 740 may reside on one or both sides of waveguide 710/712. In the embodiment shown, connecting dielectrics 740 are thinner than waveguide 710/712. Further, connecting dielectrics 740 extend over, and possibly past, electrodes 720 and 730. Thus, electro-optic device 700 is analogous to electro-optic device 600. In addition, waveguide 710/712 also utilizes additional layer 760 that is below connecting dielectric 740. For example, additional waveguide layer 760 may be a heater, another electro-optic material and/or analogous component. In some embodiments, waveguide 710/712 may also reside below connecting dielectrics 740.

Electro-optic device 700 may share the benefits of electro-optic device 100. Because of the use of thin film materials such as LN and/or LT for waveguide 710/712, a larger optical modulation as well as lower optical losses may be achieved. Use of connecting dielectrics 740 improves the concentration of the electric field at waveguide 710/712 and, therefore, further may enhance optical modulation. Consequently, optical efficiency of electro-optic device 700 may be further improved.

Figure 8:
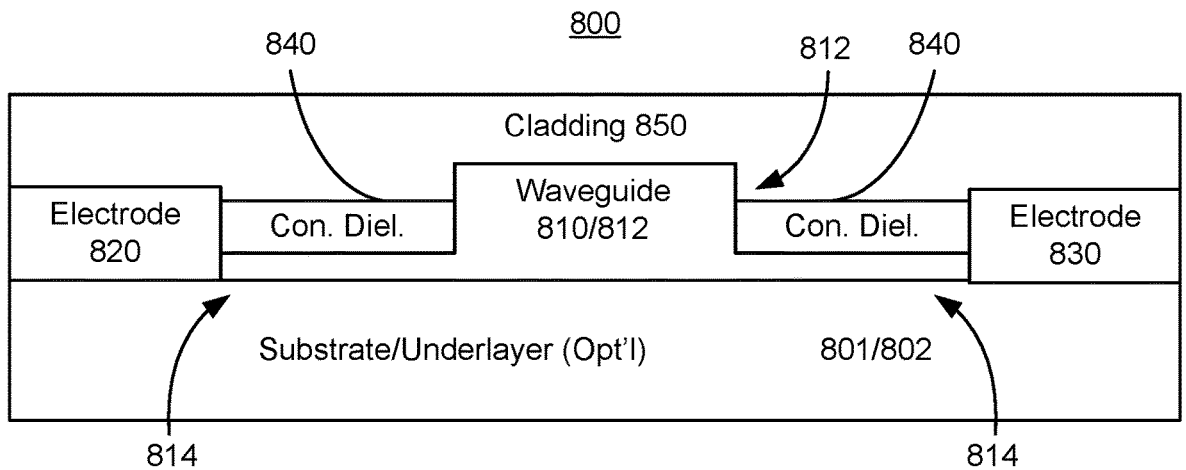

FIG. 8 is a cross-sectional view of a portion of an embodiment of electro-optic device 800. For clarity, FIG. 8 is not to scale. Electro-optic device 800 may be a modulator. For example, FIG. 8 may depict a portion of one arm (e.g. analogous to arm 110A or 110B) of electro-optic device 800. In some embodiments, electro-optic device 800 may be another device. Electro-optic device 800 is analogous to electro-optic device 100. Electro-optic device 800 includes waveguide 810/812, slab 814, electrodes 820 and 830, connecting dielectrics 840, and cladding 850 on substrate/underlayer(s) 801/802 that are analogous to waveguide 110/112, slab 114, electrodes 120 and 130, connecting dielectrics 140 and cladding 150 on substrate/underlayer(s) 101/102, respectively. Consequently, the materials, function, and configuration of waveguide 810/812, slab 814, electrodes 820 and 830, connecting dielectrics 840, cladding 850, and substrate/underlayer(s) 801/802 may be analogous to waveguide 110/112, slab 114, electrodes 120 and 130, connecting dielectrics 140, cladding 150, and substrate/underlayer(s) 101/102, respectively.

Waveguide 810/812 is a ridge waveguide. Thus, slab 814 is present. Connecting dielectrics 840 may reside on one or both sides of waveguide 810/812. In the embodiment shown, connecting dielectrics 840 are thinner than waveguide 810/812. Further, connecting dielectrics 840 are fabricated on slab 814.

Electro-optic device 800 may share the benefits of electro-optic device 100. Because of the use of thin film materials such as LN and/or LT for waveguide 810/812, a larger optical modulation as well as lower optical losses may be achieved. Use of connecting dielectrics 840 improves the concentration of the electric field at waveguide 810/812 and, therefore, further may enhance optical modulation. Consequently, optical efficiency of electro-optic device 800 may be further improved.

Figure 9:
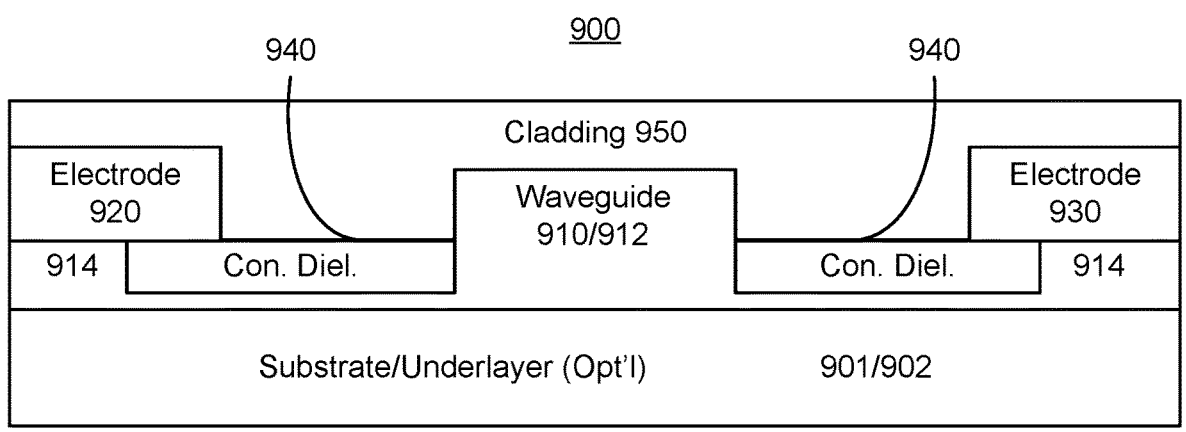

FIG. 9 is a cross-sectional view of a portion of an embodiment of electro-optic device 900. For clarity, FIG. 9 is not to scale. Electro-optic device 900 may be a modulator. For example, FIG. 9 may depict a portion of one arm (e.g. analogous to arm 110A or 110B) of electro-optic device 900. In some embodiments, electro-optic device 900 may be another device. Electro-optic device 900 is analogous to electro-optic device 100. Electro-optic device 900 includes waveguide 910/912, slab 914, electrodes 920 and 930, connecting dielectrics 940, and cladding 950 on substrate/underlayer(s) 901/902 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 910/912, slab 914, electrodes 920 and 930, connecting dielectrics 940, cladding 950, and substrate/underlayer(s) 901/902 may be analogous to waveguide 110/112, slab 114, electrodes 120 and 130, connecting dielectrics 140, cladding 150, and substrate/underlayer(s) 101/102, respectively.

Waveguide 910/912 is a ridge waveguide. Thus, slab 914 is present. Connecting dielectrics 940 may reside on one or both sides of waveguide 910/912. In the embodiment shown, connecting dielectrics 940 are embedded in or on slab 914. Further, connecting dielectrics 940 extend under electrodes 920 and 930. In some embodiments, connecting dielectrics 940 may extend past electrodes 920 and 930. Thus, electrodes 920 and 930 are fabricated partially on connecting dielectrics 940.

Electro-optic device 900 may share the benefits of electro-optic device 100. Because of the use of thin film materials such as LN and/or LT for waveguide 910/912, a larger optical modulation as well as lower optical losses may be achieved. Use of connecting dielectrics 940 improves the concentration of the electric field at waveguide 910/912 and, therefore, further may enhance optical modulation. Consequently, optical efficiency of electro-optic device 900 may be further improved.

Figure 10:
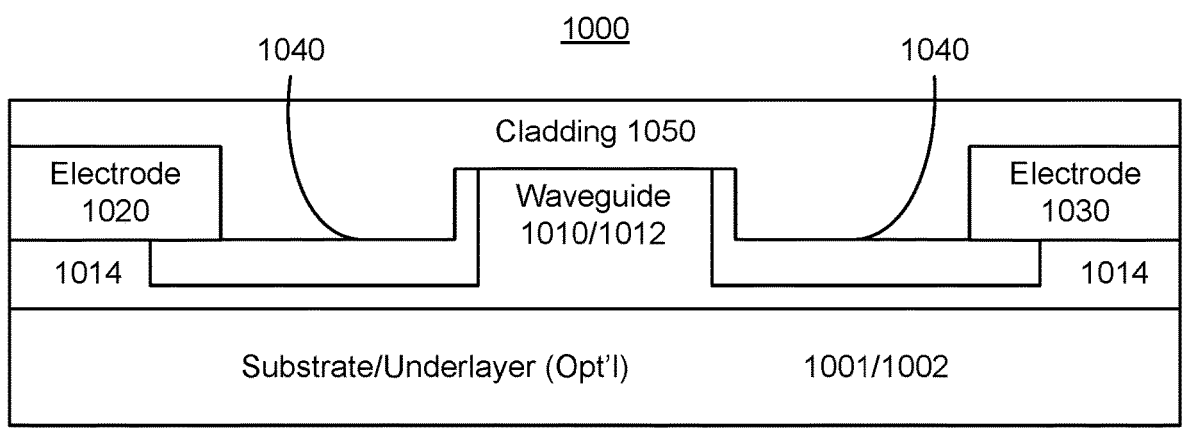

FIG. 10 is a cross-sectional view of a portion of an embodiment of electro-optic device 1000. For clarity, FIG. 10 is not to scale. Electro-optic device 1000 may be a modulator. For example, FIG. 10 may depict a portion of one arm (e.g. analogous to arm 110A or 110B) of electro-optic device 1000. In some embodiments, electro-optic device 1000 may be another device. Electro-optic device 1000 is analogous to electro-optic device 100. Electro-optic device 1000 includes waveguide 1010/1012, slab 1014, electrodes 1020 and 1030, connecting dielectrics 1040, and cladding 1050 on substrate/underlayer(s) 1001/1002 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 1010/1012, slab 1014, electrodes 1020 and 1030, connecting dielectrics 1040, cladding 1050, and substrate/underlayer(s)

1001/1002 may be analogous to waveguide 110/112, slab 114, electrodes 120 and 130, connecting dielectrics 140, cladding 150, and substrate/underlayer(s) 101/102, respectively.

Waveguide 1010/1012 is a ridge waveguide. Thus, slab 114 is present. Connecting dielectrics 1040 may reside on one or both sides of waveguide 1010/1012. In the embodiment shown, connecting dielectrics 1040 are embedded in or on slab 1014. Further, connecting dielectrics 1040 extend under electrodes 1020 and 1030. In some embodiments, connecting dielectrics 1040 may extend past electrodes 1020 and 1030. Thus, electrodes 1020 and 1030 are fabricated on connecting dielectrics 1040. In addition, connecting dielectrics 1040 extend partially or completely onto the sidewalls of waveguide 1010/1012. This may occur, for example, due to redeposition or other processing artifacts.

Electro-optic device 1000 may share the benefits of electro-optic device 100. Because of the use of thin film materials such as LN and/or LT for waveguide 1010/1012, a larger optical modulation as well as lower optical losses may be achieved. Use of connecting dielectrics 1040 improves the concentration of the electric field at waveguide 1010/1012 and, therefore, further may enhance optical modulation. Consequently, optical efficiency of electro-optic device 1000 may be further improved.

Figure 11:
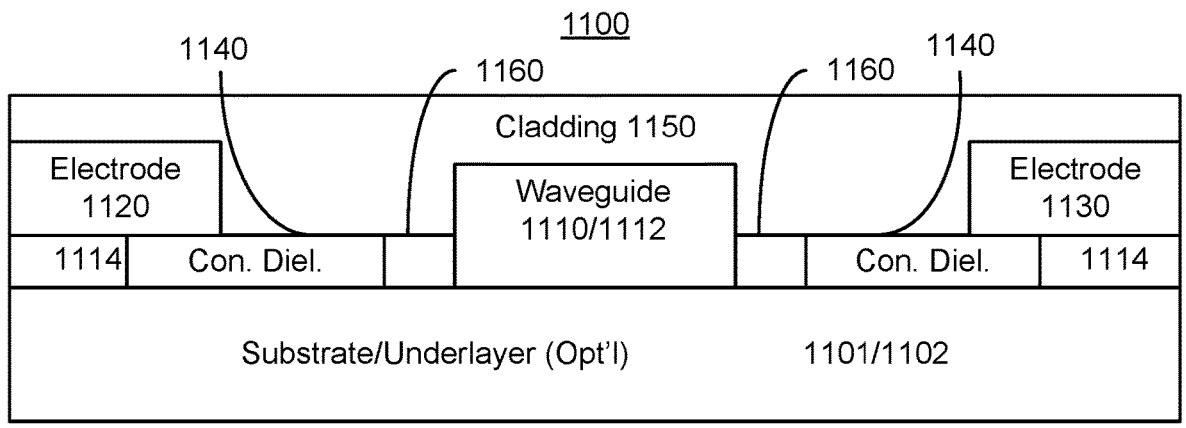

FIG. 11 is a cross-sectional view of a portion of an embodiment of electro-optic device 1100. For clarity, FIG. 11 is not to scale. Electro-optic device 1100 may be a modulator. For example, FIG. 11 may depict a portion of one arm (e.g. analogous to arm 110A or 110B) of electro-optic device 1100. In some embodiments, electro-optic device 1100 may be another device. Electro-optic device 1100 is analogous to electro-optic device 100. Electro-optic device 1100 includes waveguide 1110/1112, slab 1114, electrodes 1120 and 1130, connecting dielectrics 1140, and cladding 1150 on substrate/underlayer(s) 1101/1102 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 1110/1112, slab 1114, electrodes 1120 and 1130, connecting dielectrics 1140, cladding 1150, and substrate/underlayer(s) 1101/1102 may be analogous to waveguide 110/112, slab 114, electrodes 120 and 130, connecting dielectrics 140, cladding 150, and substrate/underlayer(s) 101/102, respectively.

Waveguide 1110/1112 is a ridge waveguide. Thus, slab 1114 is present, though separated from waveguide 1110/1112 in the embodiment shown. Connecting dielectrics 1140 may reside on one or both sides of waveguide 1110/1112. In the embodiment shown, connecting dielectrics 1140 are separated from waveguide 1110/1112 by dielectric regions 1160. In some embodiments, dielectric region 1160 may be formed of the same or analogous materials as waveguide 1110/1112. For example, 1160 may be formed of LN and/or LT. However, in other embodiments, another material including but not limited to lower dielectric constant material(s) may be used. For example, region 1160 may include silicon dioxide and/or air. Further, connecting dielectrics 1140 extend under electrodes 1120 and 1130. Thus, electrodes 1120 and 1130 are fabricated on connecting dielectrics 1140.

Electro-optic device 1100 may share the benefits of electro-optic device 100. Because of the use of thin film materials such as LN or LT for waveguide 1110/1112, a larger optical modulation as well as lower optical losses may be achieved. Use of connecting dielectrics 1140 improves the concentration of the electric field at waveguide 1110/1112 and, therefore, further may enhance optical modulation. Consequently, optical efficiency of electro-optic device 1100 may be further improved.

Figure 12:
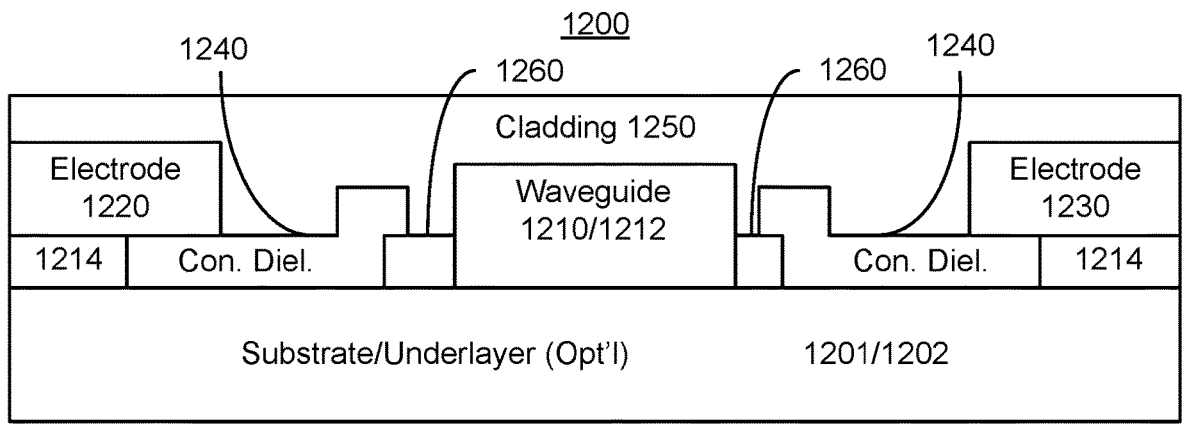

FIG. 12 is a cross-sectional view of a portion of an embodiment of electro-optic device 1200. For clarity, FIG. 12 is not to scale. Electro-optic device 1200 may be a modulator. For example, FIG. 12 may depict a portion of one arm (e.g. analogous to arm 110A or 110B) of electro-optic device 1200. In some embodiments, electro-optic device 1200 may be another device. Electro-optic device 1200 is analogous to electro-optic device 100. Electro-optic device 1200 includes waveguide 1210/1212, slab 1214, electrodes 1220 and 1230, connecting dielectrics 1240, and cladding 1250 on substrate/underlayer(s) 1201/1202 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 1210/1212, slab 1214, electrodes 1220 and 1230, connecting dielectrics 1240, cladding 1250, and substrate/underlayer(s) 1201/1202 may be analogous to waveguide 110/112, slab 114, electrodes 120 and 130, connecting dielectrics 140, cladding 150, and substrate/underlayer(s) 101/102, respectively.

Waveguide 1210/1212 is a ridge waveguide. Thus, slab 1214 is present, though separated from waveguide 1210/1212 by connecting dielectrics 1240. Connecting dielectrics 1240 may reside on one or both sides of waveguide 1210/1212. In the embodiment shown, connecting dielectrics 1240 are thinner than waveguide 1210/1212. In addition, connecting dielectrics 1240 are separated from waveguide 1210/1212 by dielectrics 1260. Dielectrics 1260 are analogous to dielectrics 1160. Thus, dielectrics 1260 might include high microwave dielectric constant materials such as those used for waveguide 1210/1212 or connecting dielectrics. In some embodiments, dielectrics 1260 might include a lower microwave dielectric constant material such as air. Connecting dielectrics 1240 also extend onto dielectrics 1260. This may occur, for example, as an artifact of processing. Further, connecting dielectrics 1240 extend under electrodes 1220 and 1230. Thus, electrodes 1220 and 1230 are fabricated on connecting dielectrics 1240.

Electro-optic device 1200 may share the benefits of electro-optic device 100. Because of the use of thin film materials such as LN and/or LT for waveguide 1210/1212, a larger optical modulation as well as lower optical losses may be achieved. Use of connecting dielectrics 1240 improves the concentration of the electric field at waveguide 1210/1212 and, therefore, further may enhance optical modulation. Consequently, optical efficiency of electro-optic device 1200 may be further improved.

Figure 13:
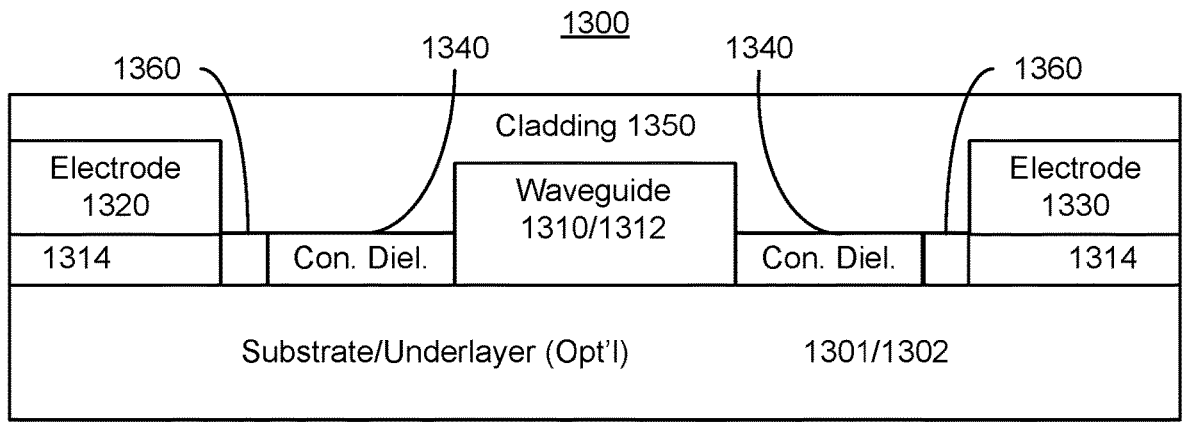

FIG. 13 is a cross-sectional view of a portion of an embodiment of electro-optic device 1300. For clarity, FIG. 13 is not to scale. Electro-optic device 1300 may be a modulator. For example, FIG. 13 may depict a portion of one arm (e.g. analogous to arm 110A or 110B) of electro-optic device 1300. In some embodiments, electro-optic device 1300 may be another device. Electro-optic device 1300 is analogous to electro-optic device 100. Electro-optic device 1300 includes waveguide 1310/1312, slab 1314, electrodes 1320 and 1330, connecting dielectrics 1340, and cladding 1350 on substrate/underlayer(s) 1301/1302 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 1310/1312, slab 1314, electrodes 1320 and 1330, connecting dielectrics 1340, cladding 1350, and substrate/underlayer(s) 1301/1302 may be analogous to waveguide 110/112, slab 114, electrodes 120 and 130, connecting dielectrics 140, cladding 150, and substrate/underlayer(s) 101/102, respectively.

Waveguide 1310/1312 is a ridge waveguide. Thus, slab 1314 is present, though separated from waveguide 1310/1312. Connecting dielectrics 1340 may reside on one or both sides of waveguide 1310/1312. In the embodiment shown, connecting dielectrics 1340 are thinner than waveguide 1310/1312. In addition, connecting dielectrics 1340 are separated from electrodes 1320 and 1330 by dielectrics 1360. Dielectrics 1360 are analogous to dielectrics 1160. Thus, dielectrics 1360 might include high microwave dielectric constant materials such as those used for waveguide 1310/1312 or connecting dielectrics 1340. In some embodiments, dielectrics 1360 might include a lower microwave dielectric constant material such as air.

Electro-optic device 1300 may share the benefits of electro-optic device 100. Because of the use of thin film materials such as LN and/or LT for waveguide 1310/1312, a larger optical modulation as well as lower optical losses may be achieved. Use of connecting dielectrics 1340 improves the concentration of the electric field at waveguide 1310/1312 and, therefore, further may enhance optical modulation. Consequently, optical efficiency of electro-optic device 1300 may be further improved.

Figure 14:
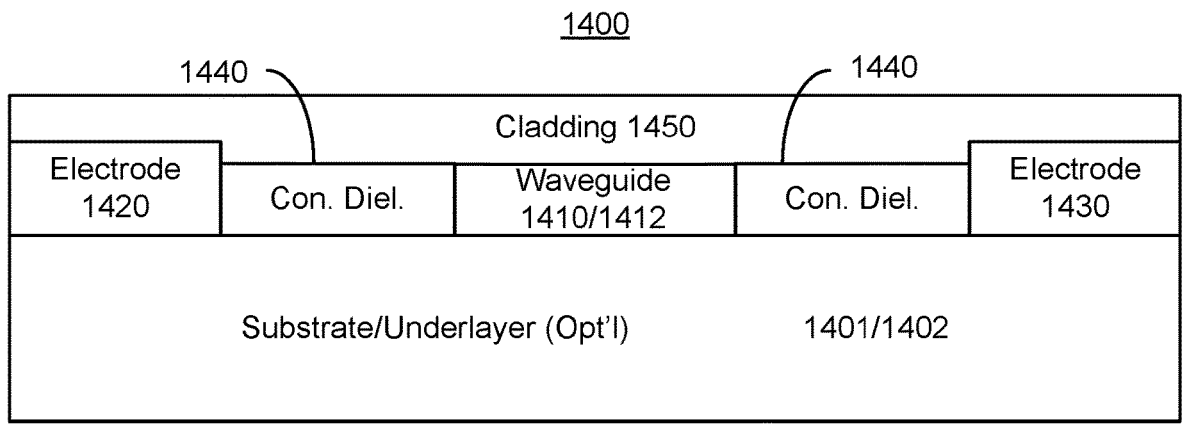

FIG. 14 is a cross-sectional view of a portion of an embodiment of electro-optic device 1400. For clarity, FIG. 14 is not to scale. Electro-optic device 1400 may be a modulator. For example, FIG. 14 may depict a portion of one arm (e.g. analogous to arm 110A or 110B) of electro-optic device 1400. In some embodiments, electro-optic device 1400 may be another device. Electro-optic device 1400 is analogous to electro-optic device 100. Electro-optic device 1400 includes waveguide 1410/1412, electrodes 1420 and 1430, connecting dielectrics 1440, and cladding 1450 on substrate/underlayer(s) 1401/1402 that are analogous to waveguide 110/112, electrodes 120 and 130, connecting dielectrics 140, and cladding 150 on substrate/underlayer(s) 101/102, respectively. Consequently, the materials, function, and configuration of waveguide 1410/1412, electrodes 1420 and 1430, connecting dielectrics 1440, cladding 1450, and substrate/underlayer(s) 1401/1402 may be analogous to waveguide 110/112, electrodes 120 and 130, connecting dielectrics 140, cladding 150, and substrate/underlayer(s) 101/102, respectively.

Waveguide 1410/1412 is a channel waveguide. Thus, slab 114 is omitted. Connecting dielectrics 1440 may reside on one or both sides of waveguide 1410/1412. In the embodiment shown, connecting dielectrics 1440 are at least the same height waveguide 1410/1412. In the embodiment shown, connecting dielectrics 1440 are the same height as waveguide 1410/1412. Waveguide 1410/1412 is still desired to confine the optical mode of the optical signal carried by waveguide 1410/1412. Consequently, the optical index of refraction of connecting dielectrics 1440 may be less than that of waveguide 1410/1412.

Electro-optic device 1400 may share the benefits of electro-optic device 100. Because of the use of thin film materials such as LN and/or LT for waveguide 1410/1412, a larger optical modulation as well as lower optical losses may be achieved. Use of connecting dielectrics 1440 improves the concentration of the electric field at waveguide 1410/1412 and, therefore, further may enhance optical modulation. Consequently, optical efficiency of electro-optic device 1400 may be further improved.

Figure 15:
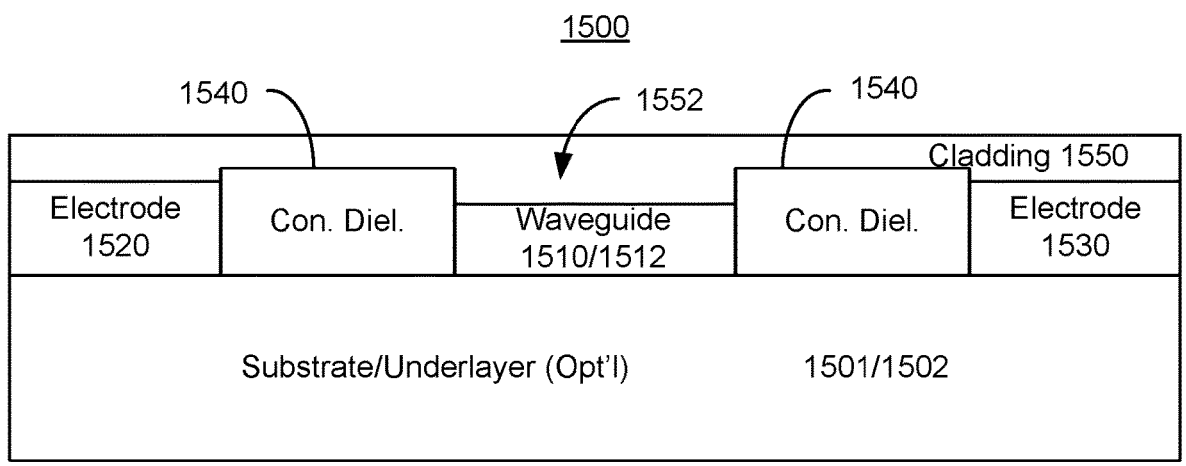

FIG. 15 is a cross-sectional view of a portion of an embodiment of electro-optic device 1500. For clarity, FIG. 15 is not to scale. Electro-optic device 1500 may be a modulator. For example, FIG. 15 may depict a portion of one arm (e.g. analogous to arm 110A or 110B) of electro-optic device 1500. In some embodiments, electro-optic device 1500 may be another device. Electro-optic device 1500 is analogous to electro-optic device 100. Electro-optic device 1500 includes waveguide 1510/1512, electrodes 1520 and 1530, connecting dielectrics 1540, and cladding 1550 on substrate/underlayer(s) 1501/1502 that are analogous to waveguide 110/112, electrodes 120 and 130, connecting dielectrics 140, and cladding 150 on substrate/underlayer(s) 101/102, respectively. Consequently, the materials, function, and configuration of waveguide 1510/1512, electrodes 1520 and 1530, connecting dielectrics 1540, cladding 1550, and substrate/underlayer(s) 1501/1502 may be analogous to waveguide 110/112, electrodes 120 and 130, connecting dielectrics 140, cladding 150, and substrate/underlayer(s) 101/102, respectively.

Waveguide 1510/1512 is a channel waveguide. Thus, slab 114 is omitted. Connecting dielectrics 1540 may reside on one or both sides of waveguide 1510/1512. In the embodiment shown, connecting dielectrics 1540 are at least the same height waveguide 1510/1512. In the embodiment shown, connecting dielectrics 1540 are taller than waveguide 1510/1512. As a result, notch 1552 above waveguide 1510/1512 is present. Notch 1552 includes low microwave dielectric constant material(s), such as cladding 1550. In some embodiments, notch 1552 may (or may not) reach the top of waveguide 1510/1512. The lower dielectric constant notch 1552 is desired, however, to prevent connecting dielectrics 1540 from contacting each other over waveguide 1510/1512. Contact between connecting dielectrics 1540 at waveguide 1510/1512 (i.e. removal of notch 1552) may increase the capacitance due to connecting dielectrics 1540 and adversely affect electro-optic efficiency of device 1500. Waveguide 1510/1512 is still desired to confine the optical mode of the optical signal carried by waveguide 1510/1512. Consequently, the optical index of refraction of connecting dielectrics 1540 may be less than that of waveguide 1510/1512.

Electro-optic device 1500 may share the benefits of electro-optic device 100. Because of the use of thin film materials such as LN and/or LT for waveguide 1510/1512, a larger optical modulation as well as lower optical losses may be achieved. Use of connecting dielectrics 1540 improves the concentration of the electric field at waveguide 1510/1512 and, therefore, further may enhance optical modulation. Consequently, optical efficiency of electro-optic device 1500 may be further improved.

Figure 16:
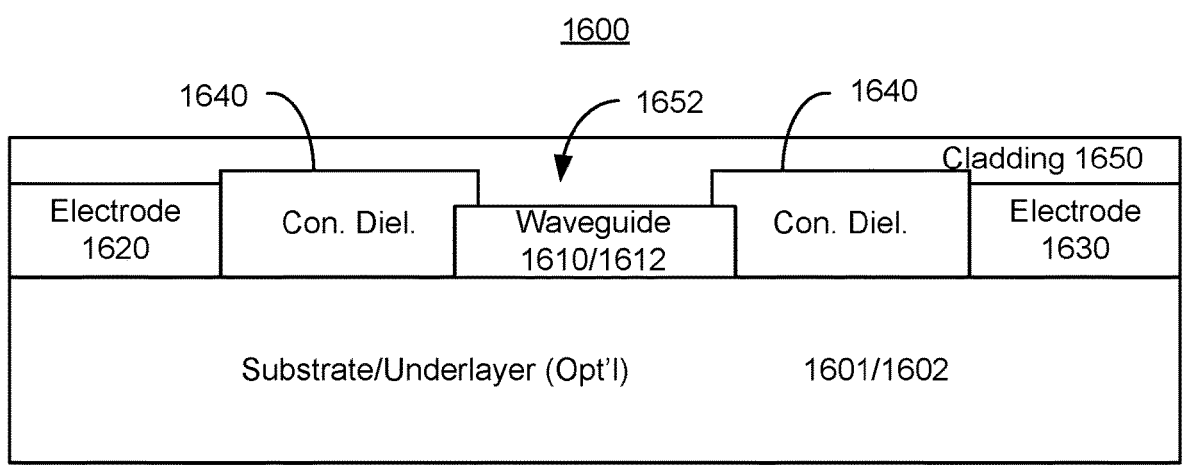

FIG. 16 is a cross-sectional view of a portion of an embodiment of electro-optic device 1600. For clarity, FIG. 16 is not to scale. Electro-optic device 1600 may be a modulator. For example, FIG. 16 may depict a portion of one arm (e.g. analogous to arm 110A or 110B) of electro-optic device 1600. In some embodiments, electro-optic device 1600 may be another device. Electro-optic device 1600 is analogous to electro-optic device 100. Electro-optic device 1600 includes waveguide 1610/1612, electrodes 1620 and 1630, connecting dielectrics 1640, and cladding 1650 on substrate/underlayer(s) 1601/1602 that are analogous to waveguide 110/112, electrodes 120 and 130, connecting dielectrics 140, and cladding 150 on substrate/underlayer(s) 101/102, respectively. Consequently, the materials, function, and configuration of waveguide 1610/1612, electrodes 1620 and 1630, connecting dielectrics 1640, cladding 1650, and substrate/underlayer(s) 1601/1602 may be analogous to waveguide 110/112, electrodes 120 and 130, connecting dielectrics 140, cladding 150, and substrate/underlayer(s) 101/102, respectively.

Waveguide 1610/1612 is a channel waveguide. Thus, slab 114 is omitted. Connecting dielectrics 1640 may reside on one or both sides of waveguide 1610/1612. In the embodiment shown, connecting dielectrics 1640 are at least the same height waveguide 1610/1612. In the embodiment shown, connecting dielectrics 1640 are taller than waveguide 1610/1612. Thus, electro-optic device 1600 is also analogous to electro-optic device 1500. In addition, connecting dielectrics 1640 extend over a portion of waveguide 1610/1612. As a result, notch 1652 above waveguide 1610/1612 is present, but narrower than notch 1552. Notch 1652 includes low microwave dielectric constant material(s), such as cladding 1650. In some embodiments, notch 1652 may (or may not) reach the top of waveguide 1610/1612. Notch 1652 prevents connecting dielectrics 1640 from contacting each other over waveguide 1610/1612, which could increase the capacitance due to connecting dielectrics 1640 and adversely affect electro-optic efficiency of device 1600. Waveguide 1610/1612 is still desired to confine the optical mode of the optical signal carried by waveguide 1610/1612. Consequently, the optical index of refraction of connecting dielectrics 1640 may be less than that of waveguide 1610/1612.

Electro-optic device 1600 may share the benefits of electro-optic device 100. Because of the use of thin film materials such as LN and/or LT for waveguide 1610/1612, a larger optical modulation as well as lower optical losses may be achieved. Use of connecting dielectrics 1640 improves the concentration of the electric field at waveguide 1610/1612 and, therefore, further may enhance optical modulation. Consequently, optical efficiency of electro-optic device 1600 may be further improved.

Figure 17:
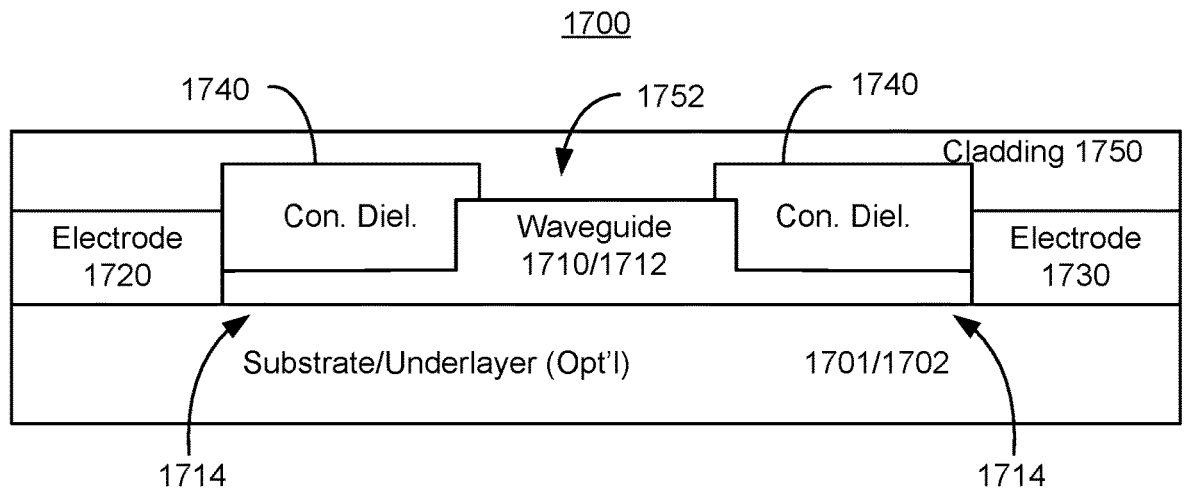

FIG. 17 is a cross-sectional view of a portion of an embodiment of electro-optic device 1700. For clarity, FIG. 17 is not to scale. Electro-optic device 1700 may be a modulator. For example, FIG. 17 may depict a portion of one arm (e.g. analogous to arm 110A or 110B) of electro-optic device 1700. In some embodiments, electro-optic device 1700 may be another device. Electro-optic device 1700 is analogous to electro-optic device 100. Electro-optic device 1700 includes waveguide 1710/1712, slab 1714, electrodes 1720 and 1730, connecting dielectrics 1740, and cladding 1750 on substrate/underlayer(s) 1701/1702 that are analogous to waveguide 110/112, slab 114, electrodes 120 and 130, connecting dielectrics 140, and cladding 150 on substrate/underlayer(s) 1701/1702 may be analogous to waveguide 110/112, slab 114, electrodes 120 and 130, connecting dielectrics 140, cladding 150, and substrate/underlayer(s) 101/102, respectively.

Waveguide 1710/1712 is a ridge waveguide. Thus, slab 1714 is present and adjacent to ridge 1712 and formed of the same material(s) as ridge 1712. Slab 1714 does not extend under electrodes 1720 or 1730. In other embodiments, slab 1714 could extend under electrode(s) 1720 and/or 1730. Connecting dielectrics 1740 may reside on one or both sides of waveguide 1710/1712. In the embodiment shown, connecting dielectrics 1740 extend above waveguide 1710/1712. Thus, the optical index of refraction of connecting dielectrics 1740 may be less than that of waveguide 1710/1712. Further, connecting dielectrics 1740 are fabricated on slab 1714.

Electro-optic device 1700 may share the benefits of electro-optic device 100. Because of the use of thin film materials such as LN and/or LT for waveguide 1710/1712, a larger optical modulation as well as lower optical losses may be achieved. Use of connecting dielectrics 1740 improves the concentration of the electric field at waveguide 1710/1712 and, therefore, further may enhance optical modulation. Consequently, optical efficiency of electro-optic device 1700 may be further improved.

Figure 18:
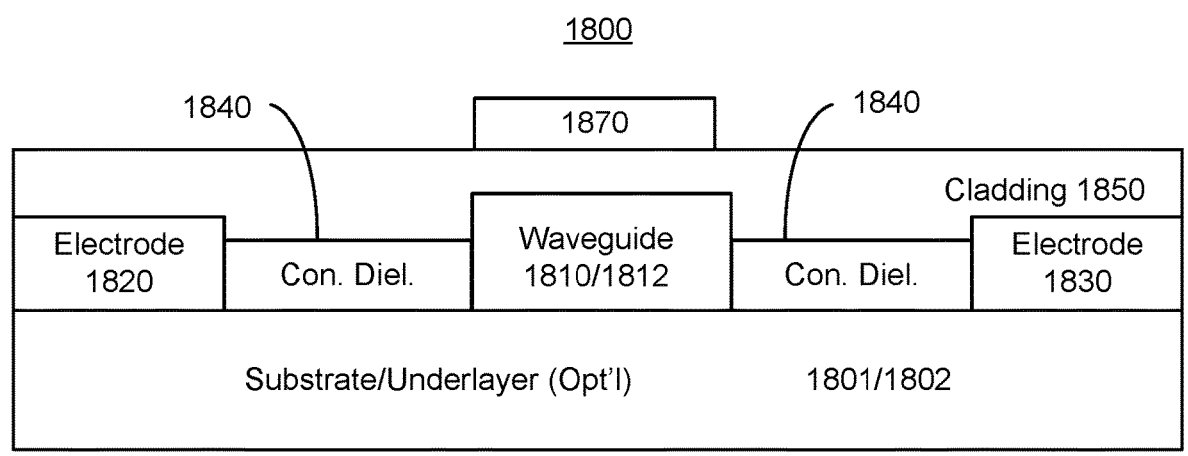

FIG. 18 is a cross-sectional view of a portion of an embodiment of electro-optic device 1800. For clarity, FIG. 18 is not to scale. Electro-optic device 1800 may be a modulator. For example, FIG. 18 may depict a portion of one arm (e.g. analogous to arm 110A or 110B) of electro-optic device 1800. In some embodiments, electro-optic device 1800 may be another device. Electro-optic device 1800 is analogous to electro-optic device 100. Electro-optic device 1800 includes waveguide 1810/1812, electrodes 1820 and 1830, connecting dielectrics 1840, and cladding 1850 on substrate/underlayer(s) 1801/1802 that are analogous to waveguide 110/112, electrodes 120 and 130, connecting dielectrics 140, and cladding 150 on substrate/underlayer(s) 101/102, respectively. Consequently, the materials, function, and configuration of waveguide 1810/1812, electrodes 1820 and 1830, connecting dielectrics 1840, cladding 1850, and substrate/underlayer(s) 1801/1802 may be analogous to waveguide 110/112, electrodes 120 and 130, connecting dielectrics 140, cladding 150, and substrate/underlayer(s) 101/102, respectively.

Waveguide 1810/1812 is a channel waveguide. Connecting dielectrics 1840 may reside on one or both sides of waveguide 1810/1812. In the embodiment shown, connecting dielectrics 1840 are thinner than waveguide 1810/1812. Also shown is additional electrode 1870. Electrode 1870 may be fabricated in an analogous manner to electrode(s) 1820 and/or 1830.

Electro-optic device 1800 may share the benefits of electro-optic device 100. Because of the use of thin film materials such as LN and/or LT for waveguide 1810/1812, a larger optical modulation as well as lower optical losses may be achieved. Use of connecting dielectrics 1840 improves the concentration of the electric field at waveguide 1810/1812 and, therefore, further may enhance optical modulation. Consequently, optical efficiency of electro-optic device 1800 may be further improved.

Figure 19:
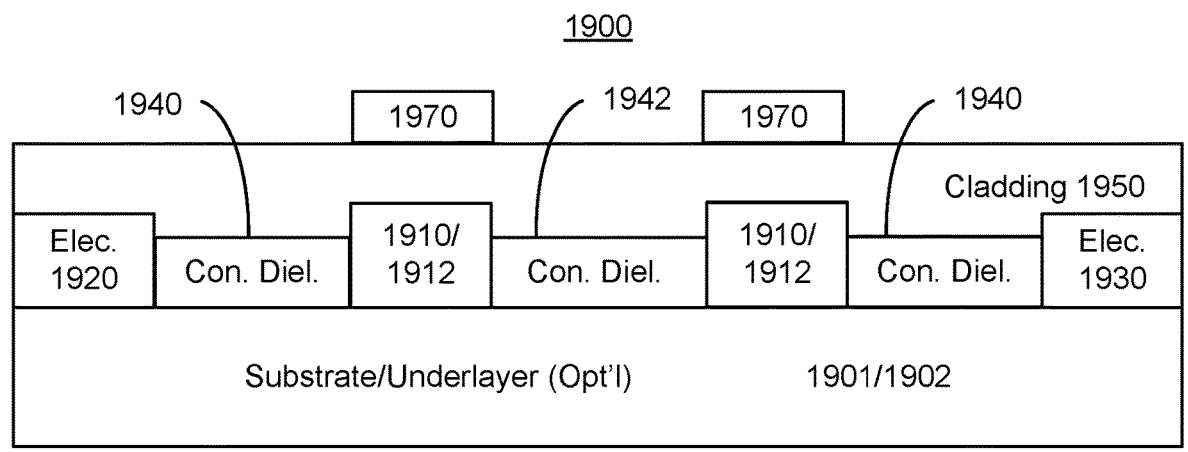

FIG. 19 is a cross-sectional view of a portion of an embodiment of electro-optic device 1900. For clarity, FIG. 19 is not to scale. Electro-optic device 1900 may be a modulator. For example, FIG. 19 may depict a portion of one arm (e.g. analogous to arm 110A or 110B) of electro-optic device 1900. In some embodiments, electro-optic device 1900 may be another device. Electro-optic device 1900 is analogous to electro-optic device 100. Electro-optic device 1900 includes waveguide 1910/1912, electrodes 1920 and 1930, connecting dielectrics 1940, and cladding 1950 on substrate/underlayer(s) 1901/1902 that are analogous to waveguide 110/112, electrodes 120 and 130, connecting dielectrics 140, and cladding 150 on substrate/underlayer(s) 101/102, respectively. Consequently, the materials, function, and configuration of waveguide 1910/1912, electrodes 1920 and 1930, connecting dielectrics 1940, cladding 1950, and substrate/underlayer(s) 1901/1902 may be analogous to waveguide 110/112, electrodes 120 and 130, connecting dielectrics 140, cladding 150, and substrate/underlayer(s) 101/102, respectively.

Electro-optic device 1900 includes two waveguides 1910/1912 separated by an additional connecting dielectric 1942. Connecting dielectric 1942 is analogous to connecting dielectrics 1940. Waveguides 1910/1912 are channel waveguides. Connecting dielectrics 1940 may reside on one or both sides of waveguide 1910/1912. In the embodiment shown, connecting dielectrics 1940 are thinner than waveguide 1910/1912. Also shown are additional electrodes 1970 over waveguides 1910/1912. Electrodes 1970 may be fabricated in an analogous manner to electrode(s) 1920 and/or 1930.

Electro-optic device 1900 may share the benefits of electro-optic device 100. Because of the use of thin film materials such as LN and/or LT for waveguide 1910/1912, a larger optical modulation as well as lower optical losses may be achieved. Use of connecting dielectrics 1940 improves the concentration of the electric field at waveguide 1910/1912 and, therefore, further may enhance optical modulation. Consequently, optical efficiency of electro-optic device 1900 may be further improved.

Figure 20:
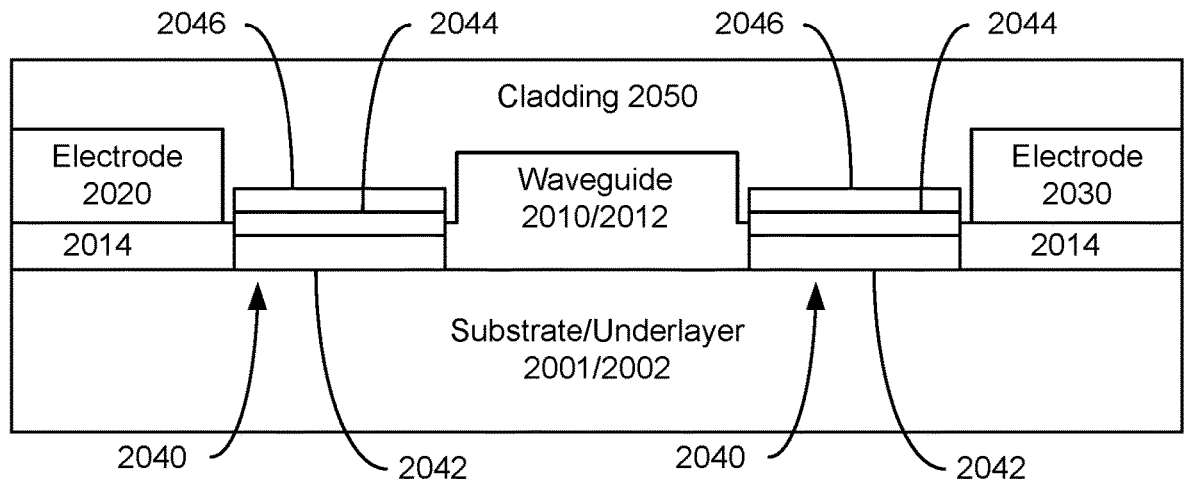

FIG. 20 is a cross-sectional view of a portion of an embodiment of electro-optic device 2000. For clarity, FIG. 20 is not to scale. Electro-optic device 2000 may be a modulator. For example, FIG. 20 may depict a portion of one arm (e.g. analogous to arm 110A or 110B) of electro-optic device 2000. In some embodiments, electro-optic device 2000 may be another device. Electro-optic device 2000 is analogous to electro-optic device 100. Electro-optic device 2000 includes waveguide 2010/2012, slab 2014, electrodes 2020 and 2030, connecting dielectrics 2040, and cladding 2050 on substrate/underlayer(s) 2001/2002 that are analogous to waveguide 110/112, slab 114, electrodes 120 and 130, connecting dielectrics 140, and cladding 150 on substrate/underlayer(s) 101/102, respectively. Consequently, the materials, function, and configuration of waveguide 2010/2012, slab 2014, electrodes 2020 and 2030, connecting dielectrics 2040, cladding 2050, and substrate/underlayer(s) 2001/2002 may be analogous to waveguide 110/112, slab 114, electrodes 120 and 130, connecting dielectrics 140, cladding 150, and substrate/underlayer(s) 101/102, respectively.

Waveguide 2010/2012 is a ridge waveguide. Thus, slab 2014 is present, though separated from waveguide 2010/2012. Connecting dielectrics 2040 may reside on one or both sides of waveguide 2010/2012. In the embodiment shown, connecting dielectrics 2040 are thinner than waveguide 2010/2012. Connecting dielectrics 2040 each includes multiple layers 2042, 2044, and 2046. In some embodiments, another number of layers may be present. Connecting dielectrics 2040 have a high microwave dielectric constant, for example, greater than that of waveguide 2010/2012. However, one or more of layers 2042, 2044, and/or 2046 may have a microwave dielectric lower than the total microwave dielectric constant of connecting dielectrics 2040. If so, one or more of the remaining layers 2042, 2044, and/or 2046 has a dielectric constant greater than the total microwave dielectric constant of connecting dielectrics 2040. In some embodiments, layers 2042, 2044, and/or 2046 may be replaced by other sub-structure(s). Thus, despite having a complex structure, connecting dielectrics 2040 may still have a microwave dielectric constant greater than that of waveguide 2010/2012.

Electro-optic device 2000 may share the benefits of electro-optic device 100. Because of the use of thin film materials such as LN and/or LT for waveguide 2010/2012, a larger optical modulation as well as lower optical losses may be achieved. Use of connecting dielectrics 2040 improves the concentration of the electric field at waveguide 2010/2012 and, therefore, further may enhance optical modulation. Consequently, optical efficiency of electro-optic device 2000 may be further improved.

Figure 21:
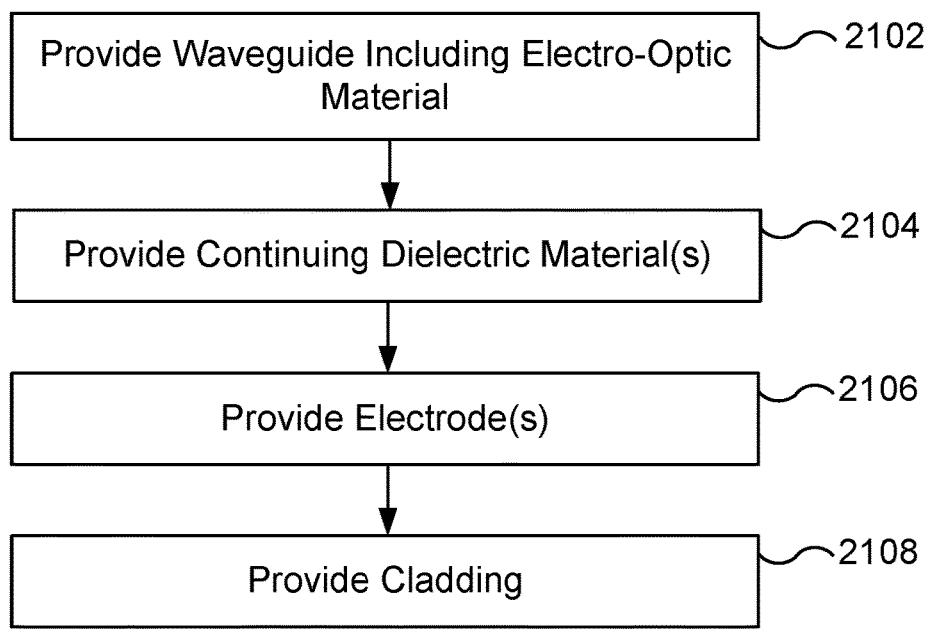
FIG. 21 is a flow chart depicting an embodiment of a method for providing an electro-optic device having high microwave dielectric constant regions.

FIG. 21 is a flow chart depicting an embodiment of method 2100 for providing an electro-optic device including connecting dielectrics. Method 2100 is described in the context of processes that may have sub-processes. Although described in a particular order, another order not inconsistent with the description herein may be utilized.

A waveguide including electro-optic materials is provided, at 2102. In some embodiments, a thin film (e.g. less than one micrometer thick) of nonlinear optical material, such as LN and/or LT, is provided and patterned to form a low loss waveguide. In some embodiments, ultraviolet (UV) and/or deep ultraviolet (DUV) photolithography may be used to pattern masks for the nonlinear optical material. For example, a hard mask layer is provided on the nonlinear optical thin film. A UV or DUV mask layer is provided on the hard mask layer and patterned using UV or DUV photolithography. A hard mask is formed from the hard mask layer by transferring the pattern of the mask to the hard mask layer. For example, portions of the hard mask layer uncovered by apertures in the mask may be selectively etched. The hard mask may have depressions or apertures in regions in which the hard mask layer was etched. The pattern of the hard mask may be transferred to the nonlinear optical material thin film layer, for example using physical etch(es).

Connecting dielectric(s) are provided, at 2104. The connecting dielectrics have microwave dielectric constant(s) greater than the microwave dielectric constant of the waveguide.

Electrodes having the desired configuration are provided, at 2106. For example, the electrodes may be evaporated or electroplated at 2106. In some embodiments, 2106 includes providing electrode(s) having channel regions and extensions.

Cladding may be provided on the fabricated components, at 2108. Fabrication of the electro-optic device may then be completed.

For example, optical modulator 100 may be provided using method 2100. Waveguide 110/112 may be fabricated at 2102. A thin film of nonlinear optical material is provided and etched to form ridge 112 and slab 114. Connecting dielectrics 140 are formed at 2102 and electrodes 120 and 130 are formed at 2104. Cladding 150 covering these components may be provided, at 2108.

Thus, method 2100 forms electro-optic device(s) such as devices 100, 200, 300, 400, 400, 600, 700, 800, 900, 1000, 1100, 1200, 1300, 1400, 1600, 1600, 1700, 1800, 1900, and 2000. Consequently, the benefits of such electro-optic devices, including improved electro-optic efficiency, may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An optical device, comprising:
a waveguide including an electro-optic material having a waveguide optical refractive index and a waveguide microwave dielectric constant, the electro-optic material including lithium;
a plurality of electrodes including a first electrode and a second electrode, a portion of the waveguide being between the first electrode and the second electrode; and
a connecting dielectric, at least a portion of the connecting dielectric being between the portion of the waveguide and electrodes, the connecting dielectric having a microwave dielectric constant greater than the waveguide microwave dielectric constant.

2. The optical device of claim 1, further comprising:
cladding, residing on the waveguide and having a cladding optical refractive index less than the waveguide optical refractive index.

3. The optical device of claim 1, wherein a first portion of the connecting dielectric resides between the plurality of electrodes and a substrate.

4. The optical device of claim 3, further comprising:
an interlayer between the first portion of the connecting dielectric and the plurality of electrodes.

5. The optical device of claim 1, wherein the waveguide has a height and wherein the connecting dielectric extends at least to the height of the waveguide, the connecting dielectric having an optical refractive index less than the waveguide optical refractive index.

6. The optical device of claim 1, wherein the connecting dielectric includes at least one of titanium dioxide, barium titanate (BTO), lead zirconate titanate (PZT), barium strontium titanate, strontium titanate, a conjugated polymer.

7. The optical device of claim 1, wherein the connecting dielectric includes a plurality of layers, at least one of the plurality of layers having the microwave dielectric constant.

8. The optical device of claim 1, wherein the waveguide is selected from a ridge waveguide and a channel waveguide.

9. The optical device of claim 1, wherein the waveguide microwave dielectric constant of the electro-optic material is at least twelve, and wherein the connecting dielectric has a connecting dielectric optical refractive index less than the waveguide optical refractive index such that confinement of an optical mode by the waveguide is maintained with an optical mode cross-sectional area of not more than three multiplied by the square of an optical mode wavelength.

10. The optical device of claim 1, wherein the waveguide and the connecting dielectric are on a substrate, the waveguide and the connecting dielectric being located such that the optical device is free of the connecting dielectric directly between the waveguide and the substrate.

11. An optical device, comprising:
a waveguide including a first electro-optic material having a waveguide optical refractive index and a waveguide microwave dielectric constant, the first electro-optic material including lithium;
a plurality of electrodes including a first electrode and a second electrode, a portion of the waveguide being between the first electrode and the second electrode; and
a connecting dielectric configured to direct an electric field generated by a signal in at least one of the plurality of electrodes to the waveguide, the connecting dielectric having a microwave dielectric constant not less than the waveguide microwave dielectric constant and including a second electro-optic material different from the first electro-optic material.

12. The optical device of claim 11, further comprising:
cladding, residing on the waveguide and having a cladding optical refractive index less than the waveguide optical refractive index.

13. A method, comprising:
providing a waveguide including an electro-optic material having a waveguide optical refractive index and a waveguide microwave dielectric constant, the electro-optic material including lithium;
providing a plurality of electrodes including a first electrode and a second electrode, a portion of the waveguide being between the first electrode and the second electrode; and
providing a connecting dielectric, at least a portion of the connecting dielectric being between the portion of the waveguide and electrodes, the connecting dielectric having a microwave dielectric constant not less than the waveguide microwave dielectric constant.

14. The method of claim 13, further comprising:
providing cladding, residing on the waveguide and having a cladding optical refractive index less than the waveguide optical refractive index.

15. The method of claim 13, wherein a first portion of the connecting dielectric resides between the plurality of electrodes and a substrate.

16. The method of claim 15, further comprising:
providing an interlayer between the first portion of the connecting dielectric and the plurality of electrodes.

17. The method of claim 13, wherein the waveguide has a height and wherein the connecting dielectric extends at least to the height of the waveguide, the connecting dielectric having an optical refractive index less than the waveguide optical refractive index.

18. The method of claim 13, wherein the connecting dielectric includes at least one of titanium dioxide, barium titanate (BTO), lead zirconate titanate (PZT), barium strontium titanate, strontium titanate, a conjugated polymer.

19. The method of claim 13, wherein the connecting dielectric includes a plurality of layers, at least one of the plurality of layers having the microwave dielectric constant.

20. The method of claim 13, wherein the providing the waveguide further includes:
providing a ridge waveguide.

21. The method of claim 13, wherein the providing the waveguide further includes:
providing a channel waveguide.

* * * * *